US012779989B2

(12) United States Patent
Cattoor et al.

(10) Patent No.: US 12,779,989 B2
(45) Date of Patent: Nov. 3, 2026

(54) WET CLUTCH COOLED PTO DISCONNECT

(71) Applicant: DANA BELGIUM, Bruges (BE)

(72) Inventors: Kurt Cattoor, Koolkerke (BE); Filip D. Schacht, Meulebeke (BE); Filip Van Raepenbusch, Bruges (BE)

(73) Assignee: DANA BELGIUM, Bruges (BE)

(*) Notice: Subject to any disclaimer, the term of this patent is extended or adjusted under 35 U.S.C. 154(b) by 0 days.

(21) Appl. No.: 19/059,151

(22) Filed: Feb. 20, 2025

(65) Prior Publication Data

US 2025/0276574 A1 Sep. 4, 2025

Related U.S. Application Data

(60) Provisional application No. 63/560,386, filed on Mar. 1, 2024.

(51) Int. Cl.
*B60K 17/28* (2006.01)
*F16D 25/0638* (2006.01)
*F16D 25/12* (2006.01)

(52) U.S. Cl.
CPC .......... *B60K 17/28* (2013.01); *F16D 25/0638* (2013.01); *F16D 25/123* (2013.01)

(58) Field of Classification Search
CPC .... F16D 25/0638; F16D 25/123; B60K 17/28
See application file for complete search history.

(56) References Cited

U.S. PATENT DOCUMENTS

| | | | | |
|---|---|---|---|---|
| 9,416,827 | B1 * | 8/2016 | Logan | F16D 13/38 |
| 12,169,003 | B2 * | 12/2024 | Matsuo | F16D 13/72 |
| 2017/0122383 | A1 * | 5/2017 | Sugimura | F16D 13/648 |
| 2018/0163793 | A1 * | 6/2018 | Jeong | B60K 6/547 |
| 2020/0215897 | A1 * | 7/2020 | Trinkenschuh | B60K 6/547 |
| 2021/0362593 | A1 * | 11/2021 | Van Dingenen | B60K 6/365 |
| 2022/0154785 | A1 * | 5/2022 | Iwasaki | F16H 57/0424 |
| 2022/0163074 | A1 * | 5/2022 | Cattoor | F16H 61/061 |
| 2023/0055437 | A1 * | 2/2023 | Matsuo | F16D 25/0638 |
| 2023/0383797 | A1 * | 11/2023 | Muff | F16D 25/0638 |
| 2024/0336126 | A1 * | 10/2024 | Heukelbach | B60K 6/387 |
| 2024/0336127 | A1 * | 10/2024 | Lechthaler | F16H 57/0473 |

* cited by examiner

*Primary Examiner* — Farhana Pervin
(74) *Attorney, Agent, or Firm* — McCoy Russell LLP

(57) ABSTRACT

A disconnect for a power take off (PTO), the disconnect comprising: an input connected to an inner rotating component of a wet clutch and an output connected to an outer rotating component of the wet clutch, the input selectively coupling to the output by compressing a clutch pack, wherein the clutch pack is compressed by way of a fluid acting on a piston and reacting on a shaft, where the fluid is delivered via an external flow.

20 Claims, 9 Drawing Sheets

WET CLUTCH COOLED PTO DISCONNECT

CROSS REFERENCE TO RELATED APPLICATIONS

The present application claims priority to U.S. Provisional Application No. 63/560,386, entitled "WET CLUTCH COOLED PTO DISCONNECT", and filed on Mar. 1, 2024. The entire contents of the above-listed application are hereby incorporated by reference for all purposes.

TECHNICAL FIELD

The present description relates to a disconnect between a PTO and a PTO assembly that incorporates a wet clutch.

BACKGROUND AND SUMMARY

Vehicles may have and have the ability to drive one or more work implements. Such vehicles may include off-highway work vehicles, such as straddle carriers, forklifts, tractors, and some construction vehicles. Alternatively, such vehicles may include on-highway vehicles, such as semi-trucks, utility vehicles, and some construction vehicles. A vehicle may integrate a power take-off (PTO) system to transfer mechanically energy from a vehicle to operate and affect a work implement. The PTO system and work implement may be used for a plurality of purposes, such as to power and drive a driven device, referred to herein as a PTO device. The PTO device may include a pump, a blower, an air conditioning (AC) unit, a generator, a drill, or another rotational element. Vehicles may incorporate an output to the PTO device and a PTO reduction set in the transmission. The PTO system may be driven by a mover or a plurality of movers, where the mover or movers may include internal combustions engine (ICE) and/or an electric machine, such as an electric motor or an electric motor/generator.

Pumps or other PTO devices that are energy consumers draw start or stop power from the PTO system, where torque and other rotational energy is transferred to the PTO device via the PTO system. For example, drag due to the PTO devices may cause power losses to the vehicle.

A disconnect may be used between an input to a PTO device and an output from the PTO system, such as a gearset, that may transfer power to the PTO device. When the disconnect is opened, torque may immediately stop transferring from the output to the input, reducing drag. Likewise, the disconnect may be closed after the output increases to a desired speed. However, a disconnect between the input and the output may experience large differences in rotational speed and torque during engagement. Additionally, the disconnect may experience large quantities of torque and other rotational energy during and after engagement. Therein, the disconnect may experience amounts of mechanical stress and/or strain greater than a desired first threshold of force, and/or as thermal energy build up greater than a desired second threshold of temperature, which may cause degradation. To reduce degradation, lubricant greater than or equal to a third threshold of volume may be applied to the disconnect to reduce mechanical stress and strain during closing and opening of the disconnect and remove thermal energy.

This may be at least partially achieved and issue above at least partially addressed via a disconnect for a power take off (PTO), the disconnect comprising: an input connected to an inner rotating component of a wet clutch and an output connected to an outer rotating component of the wet clutch, the input selectively coupling to the output by compressing a clutch pack, wherein the clutch pack is compressed by way of a fluid acting on a piston and reacting on a shaft, where the fluid is delivered via an external flow.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
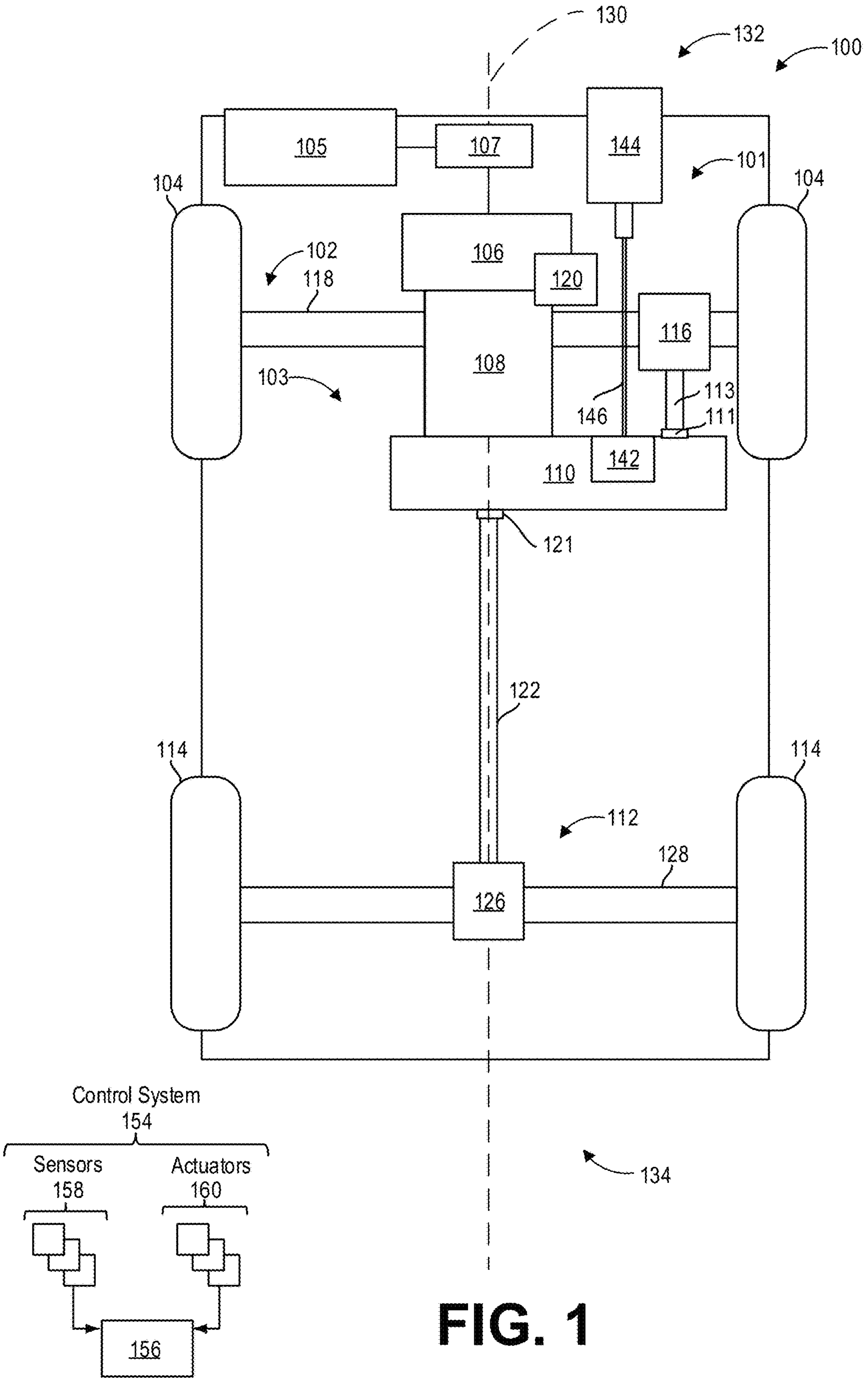
FIG. 1 shows an example schematic of a vehicle which may include a PTO device, a PTO assembly, and a disconnect assembly of the present disclosure.

The following description relates to a disconnect assembly including a lubrication system for a power take off (PTO) system that includes a PTO device and a PTO reduction set. The disconnect assembly includes an input and an output, where the input and output are rotational components that torque and rotational energy may be transmitted through. A first rotational element, such as a first shaft, may include or physically couple to the input. A second rotational element, such as a second shaft, may include or physically couple to the output. The components of disconnect assembly, including the input, the output, and components that may abut or physically couple to the input and/or output may be housed in a housing. The housing may be fluidly sealed (fluidically sealed) (e.g., be fluid tight) via a plurality of seals. The seals may include at least a first seal and a second seal, where the first seal may be positioned at opposite sides of the disconnect assembly from the second seal. The seals may include piston rings, where the first seal is or includes a first piston ring and the second seal is or includes a second piston ring. The first piston ring may fluidly seal first rotational element and/or the input with the housing. The second piston ring may fluidly seal the second rotational element and/or the output with the housing. Fluid, such as lubricant and/or actuation fluid, may be transported via fluid passages of the housing to the disconnect. Torque and rotational energy may be received via the disconnect assembly via the input. Torque may be transmitted from the disconnect assembly via the output.

The disconnect assembly includes a wet clutch, with an outer rotating component and an inner rotating component, such as a component that includes a drum and a component that includes a hub, respectively. The input may drivingly couple to the outer rotating component of the clutch. The input may physically and rigidly couple to the outer rotating component. The output may drivingly couple to the inner rotating component of the clutch. The output may physically and rigidly couple to the inner rotating component. The outer rotating component may be about, such as around, such as radially around the inner rotating component. The outer rotating component may rotate freely of the inner rotating component, and the outer rotating component may rotate and/or spin about the inner rotating component. The clutch includes a clutch pack and a piston. The clutch pack includes a plurality of friction plates and separator plates, where the friction plates may physically couple to the opposite component the separator plates physically couple to. For example, if the friction plates physically couples to the outer rotating component the separator plates physically couple to the inner rotating component. For another example if the friction plates physically couple the inner rotating component the separator plates physically couple to the outer rotating component. The friction plates and separator plates may be interleaved, such that after a friction plate may be a separator plate, and vice versa; likewise, there may be a separator plate between a pair of friction plates and vice versa. The piston may be positioned between the outer rotational element and the clutch pack. The clutch pack may be radially between the outer rotational element and the inner rotational element. Housings and wet clutches of the present disclosure may be of any size, depending on a requested capacity. Housings may comprise any material, such as cast iron or steel. Each of the housings of the present disclosure may include two sections (e.g., pieces), with a first section and a second section, to allow variations in sizing of the input, the output, outer rotating component, and the inner rotating component.

The clutch pack may be compressed by way of a fluid acting on the piston and reacting on a rotational element and/or the outer rotating component. The piston may rotate with the first rotational element and the input. Fluid sealing between housing and first rotational element happens by means of piston rings, such as the first piston ring. Scaling provided via the piston rings may increase the life (e.g., amount of duty cycles) and decrease power losses via splashing or leaking of fluid from the disconnect assembly compared to other systems, such as a disconnect assembly that may use a trust bearing in between a piston and a pressure plate of a clutch pack. Depending on the most frequent application of the wet clutch, a normally open or normally closed wet clutch may be included by the disconnect assembly.

An external fluid line (e.g., a fluid passage) may enter the disconnect assembly. There may be a plurality of external fluid lines, where each external fluid line may deliver fluid via an external flow. The fluid to be pushed through a hollow input shaft to flow through the clutch pack from the inside to the outside, where the fluid may cool and lubricate the wet clutch. Fluid lines can be connected to a small pump and external cooler in this case. The units can work without external cooling in case of weaker duty cycles or by using spreaders in between the clutch plates and may have less capacity as when external cooling is used.

The actuation piston may have different stepped diameters to allow for some modulation when the clutch is activated to close or open. For example, a clutch pressure first acts on a small piston diameter, when the piston moves forward the bigger diameter comes free and the clutch pressure can act on the total diameter of the clutch. Steps may be with or without seals between a step of the piston and a complementary step of the housing. The valve or valves can be isolated or integrated units. Likewise, the valve or valves may be on-off valves or proportional valves, where the proportional valves allow for electronic modulation (soft closing) of the clutch. The clutch can be executed as a bolt on or as an integrated version.

Figure 2:
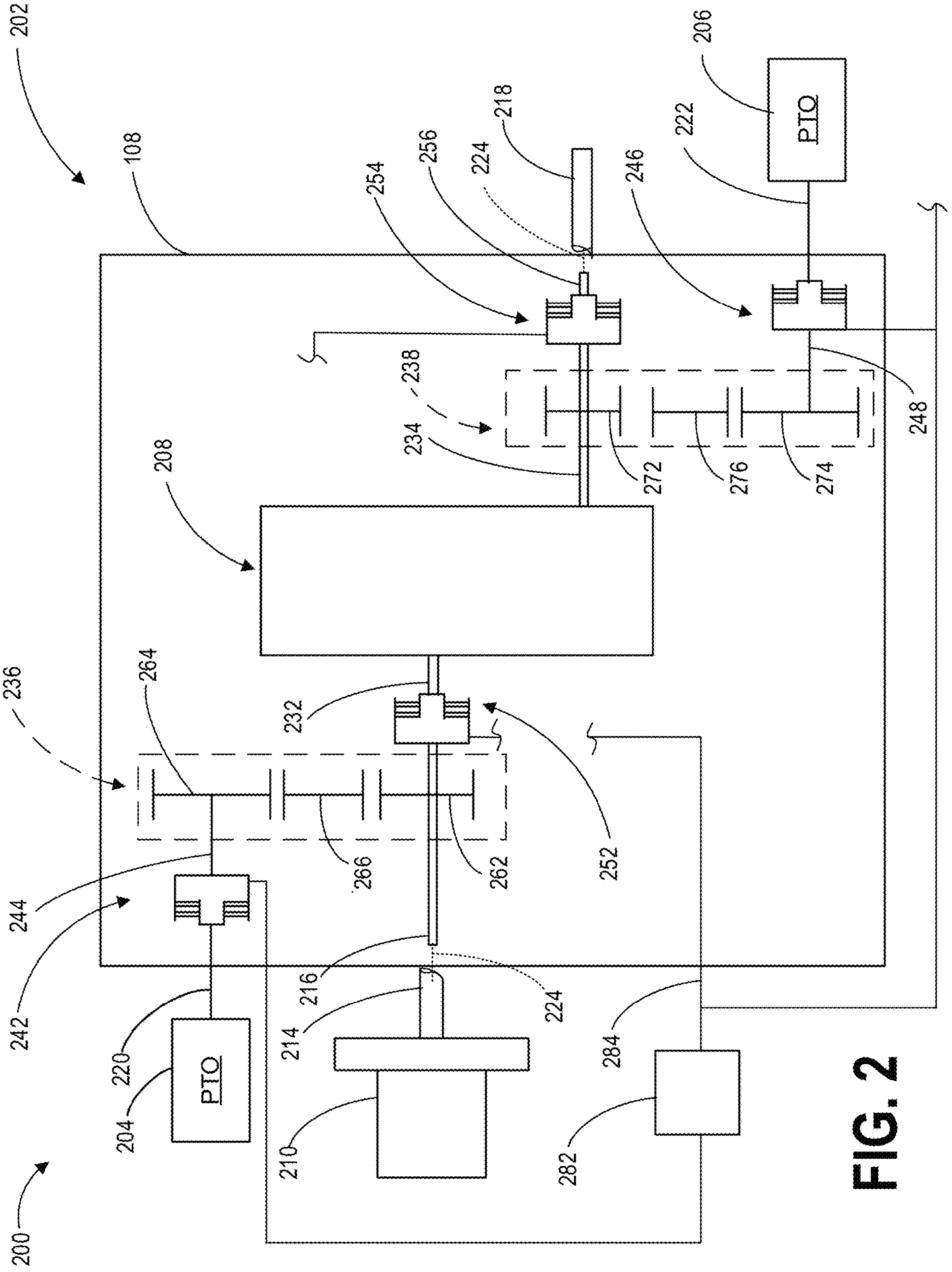
FIG. 2 shows an example schematic of a transmission system with a configuration including a plurality of PTO devices, PTO assemblies, and disconnects of the present disclosure.
Figure 3:
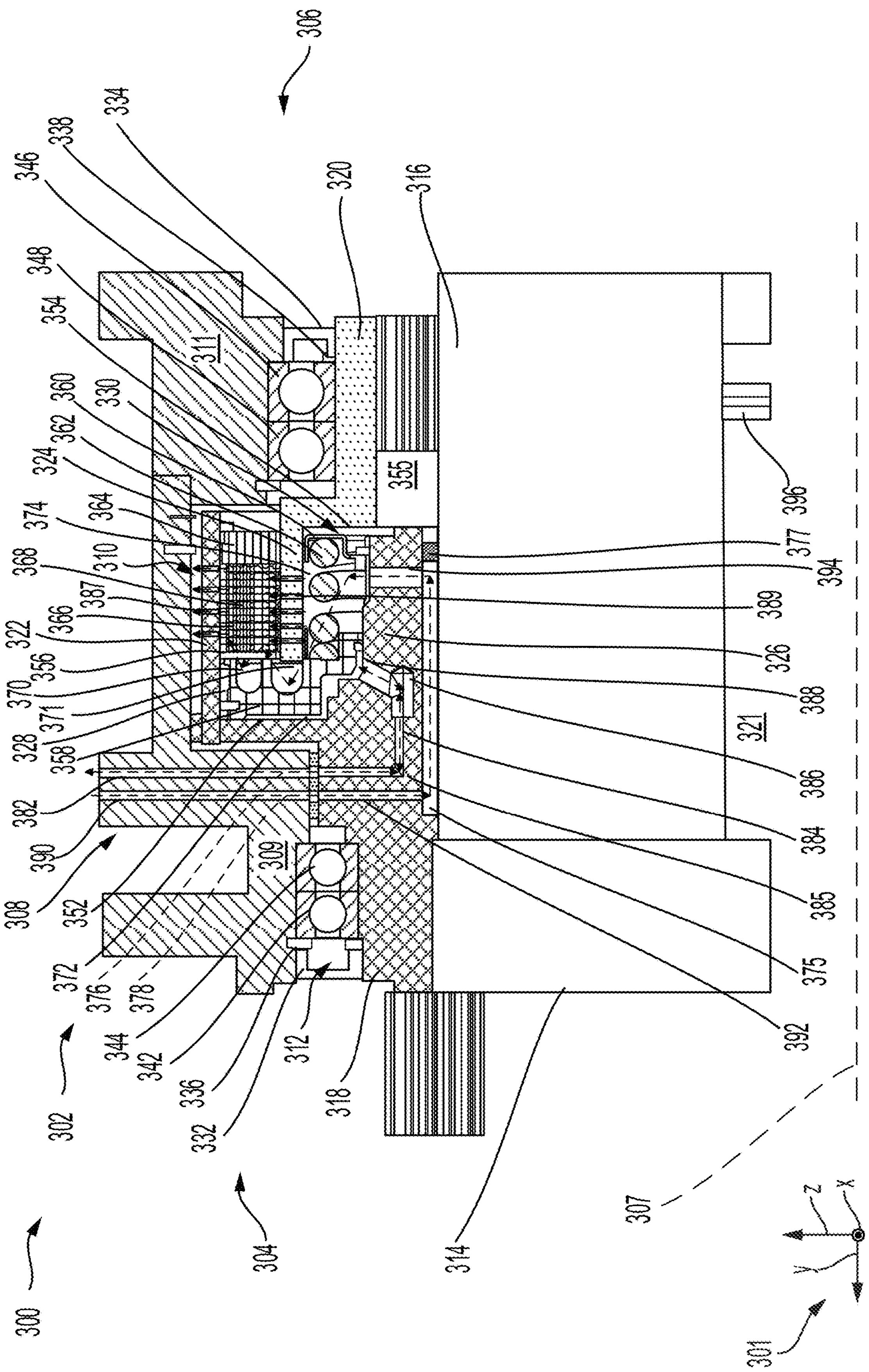
FIG. 3 shows a sectional view of a disconnect assembly.
Figure 4A:
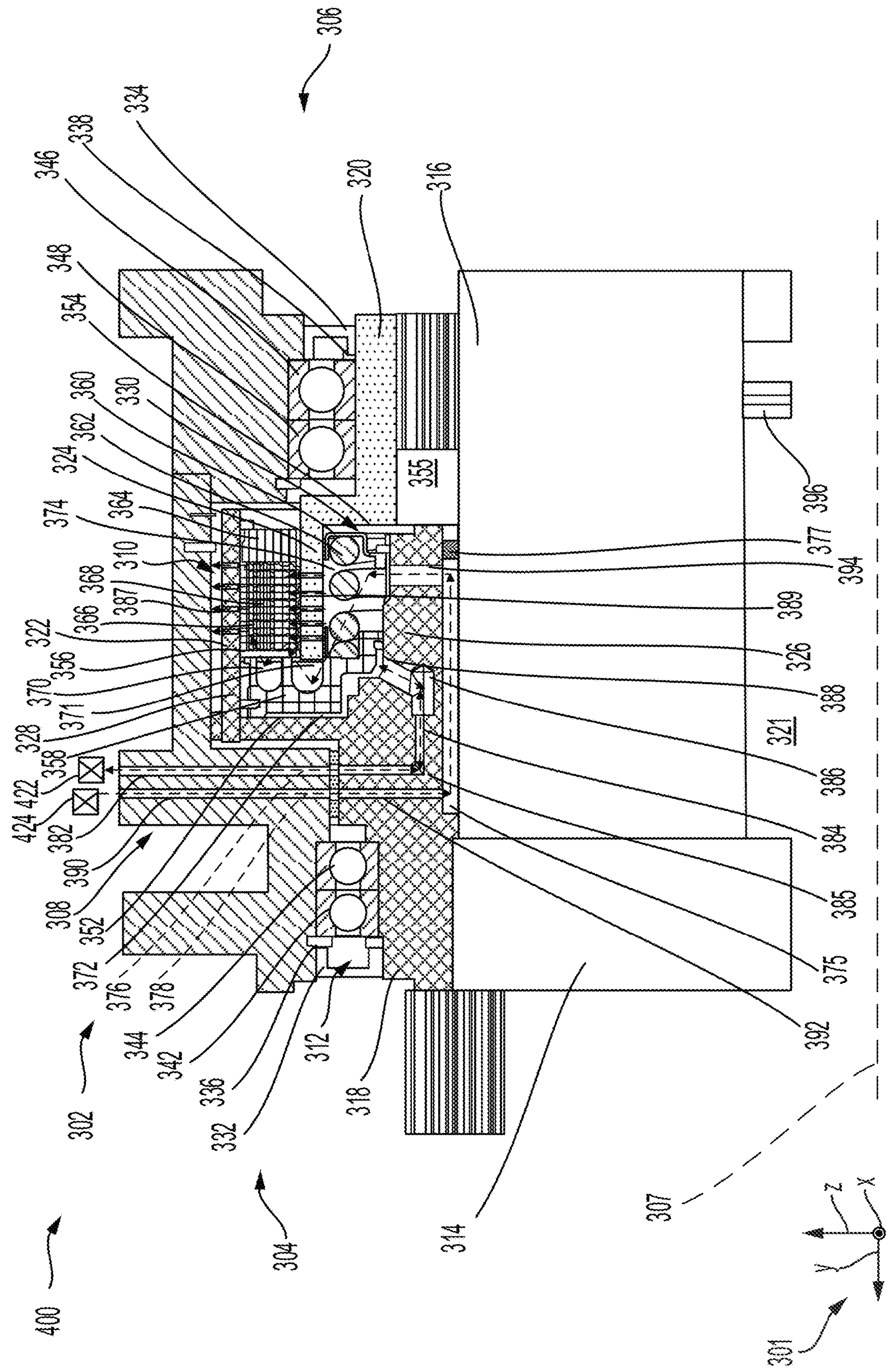
FIG. 4A shows the sectional view of the disconnect assembly with a first arrangement of valves, where the valves are shown schematically.
Figure 4B:
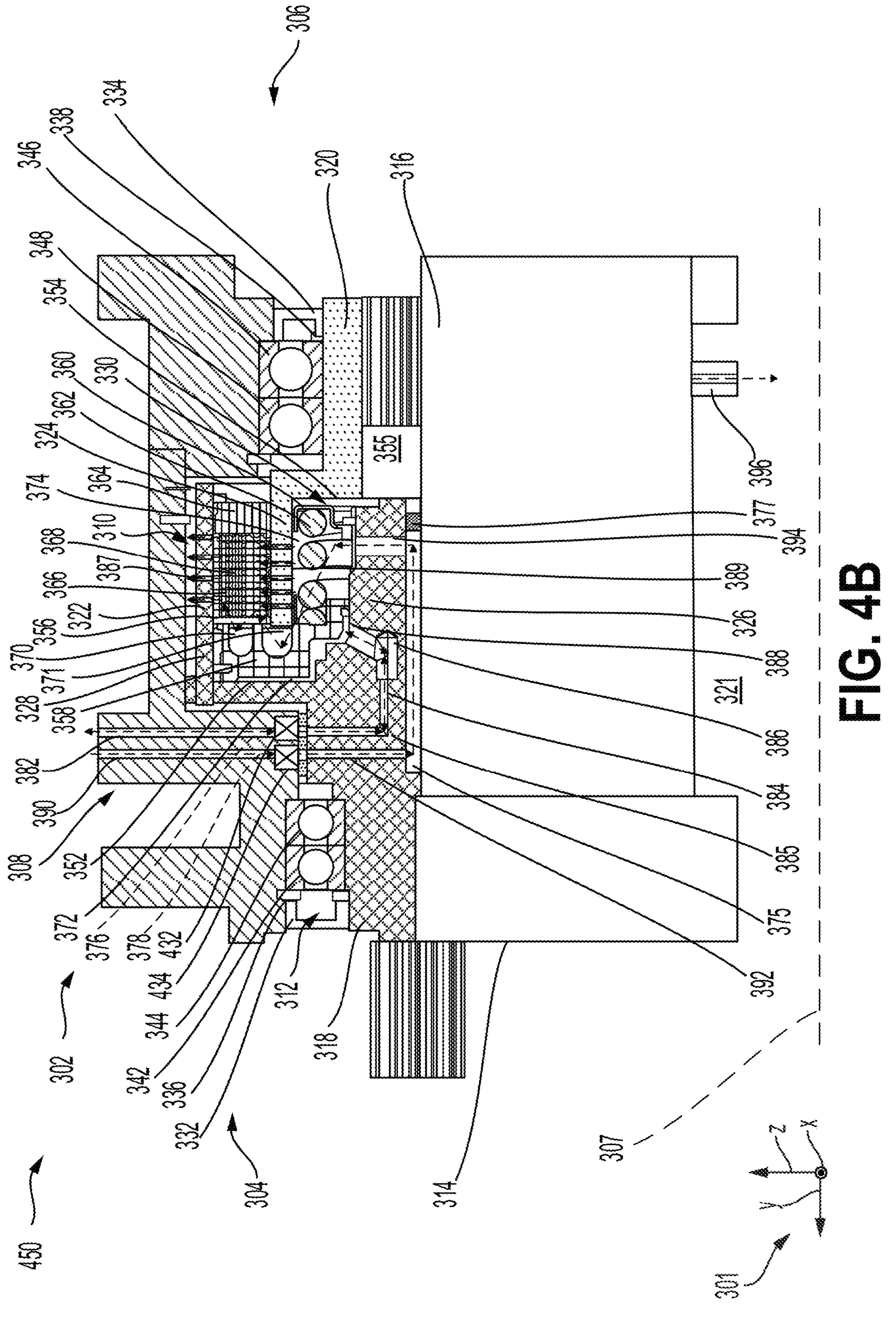
FIG. 4B shows the sectional view of the disconnect assembly with a second arrangement of valves, where the valves are shown schematically.
Figure 5:
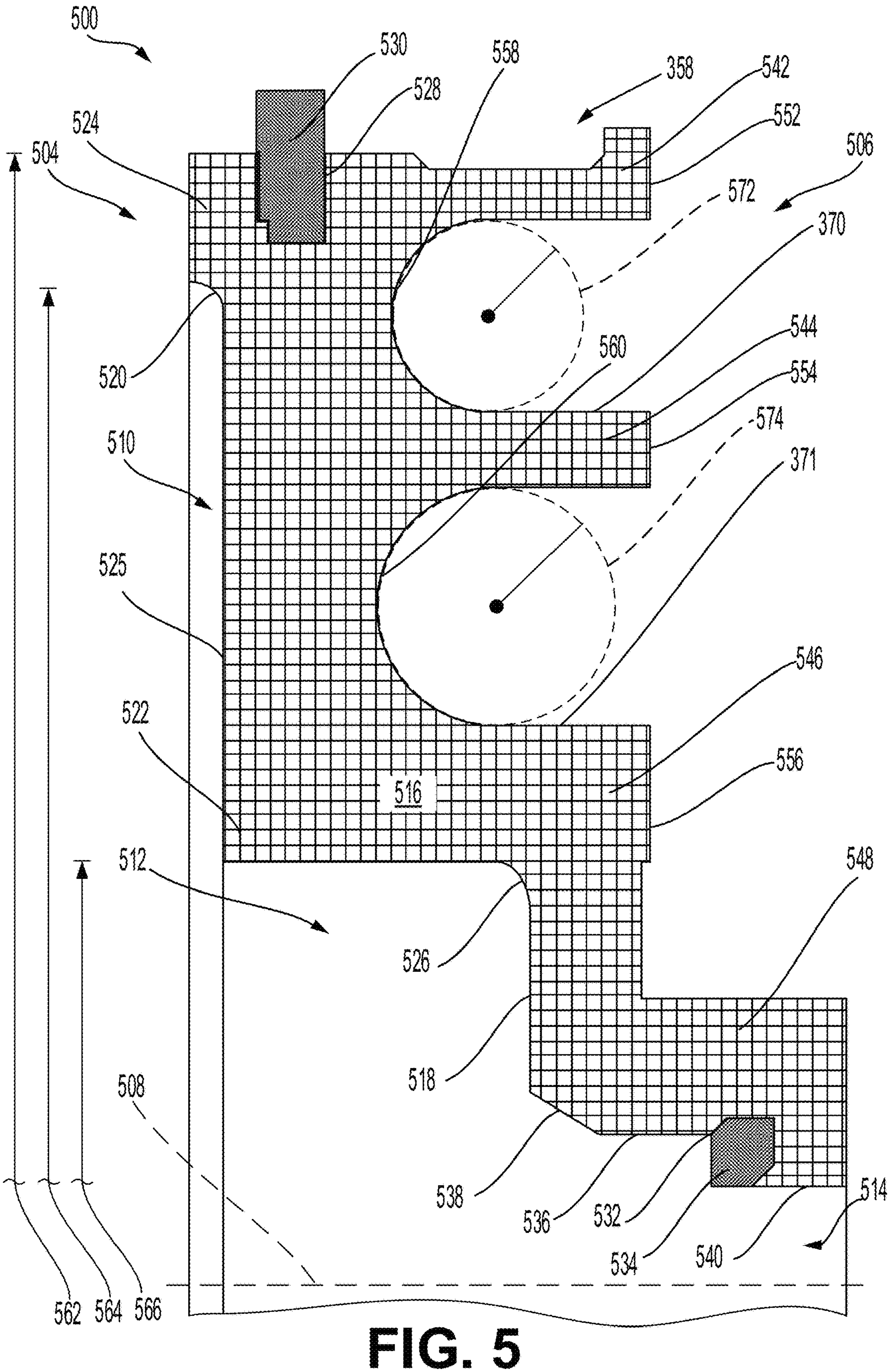
FIG. 5 shows a sectional view of a piston of the PTO device.

FIG. 1 shows an example schematic of a vehicle which may include a PTO device, a PTO assembly, and a disconnect assembly of the present disclosure. FIG. 2 shows an example schematic of a transmission system with a configuration including a plurality of PTO devices, PTO assemblies, and disconnects of the present disclosure. FIG. 3 shows a sectional view of a disconnect assembly. FIG. 4A shows the sectional view of the disconnect assembly with a first arrangement of valves. FIG. 4B shows the sectional view of the disconnect assembly with a second arrangement of valves. The disconnect assembly of FIGS. 3-4B includes a two-piece housing (e.g., having two sections), a wet clutch including an outer rotating component having a drum and an inner rotating component having a hub, and a piston that may be advanced or retracted via changes in hydraulic pressure to open and close the clutch. The first and second arrangements of valves of FIGS. 4A-4B are shown schematically, where the first arrangement of valves are external to a housing of the disconnect assembly, and the second arrangement of valves are integrated with the housing of the disconnect assembly. FIG. 5 shows a sectional view of a piston of the PTO device, where the piston is shown separated from the other features and components of the PTO device.

Figure 6:
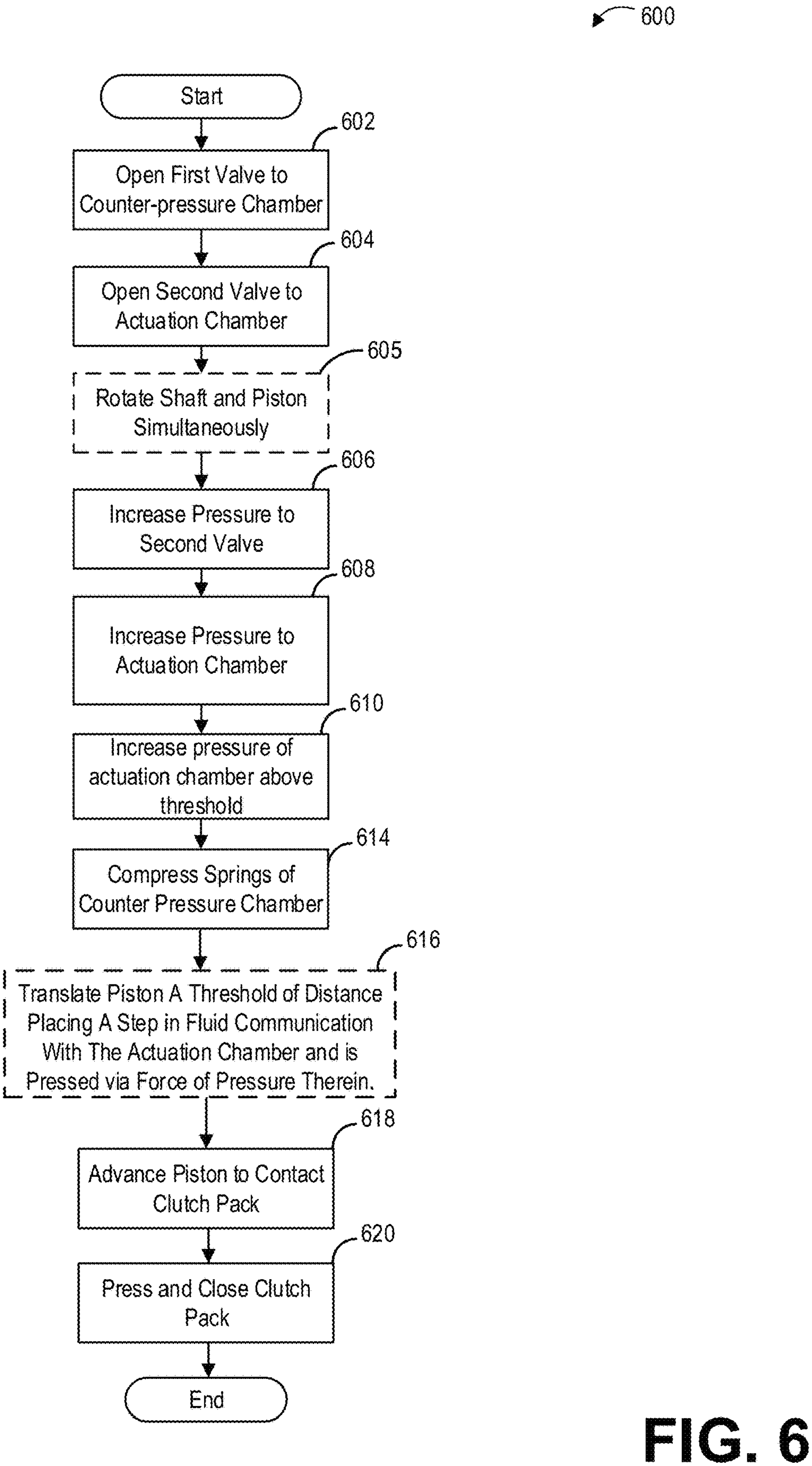
FIG. 6 shows a first method of advancing a piston and closing a clutch of the PTO.
Figure 7:
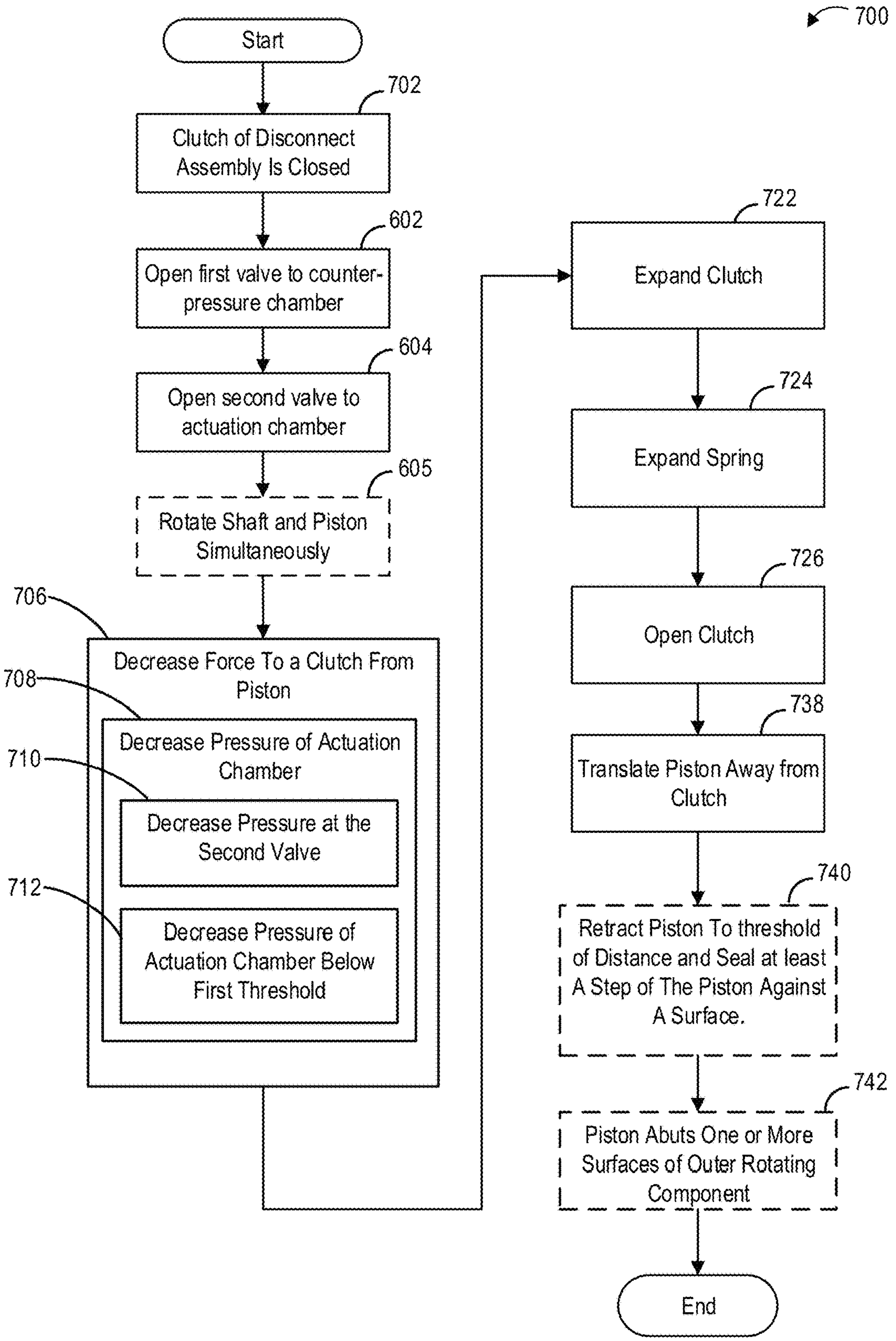
FIG. 7 shows a second method of retracting a piston and closing a clutch of the PTO.
Figure 8:
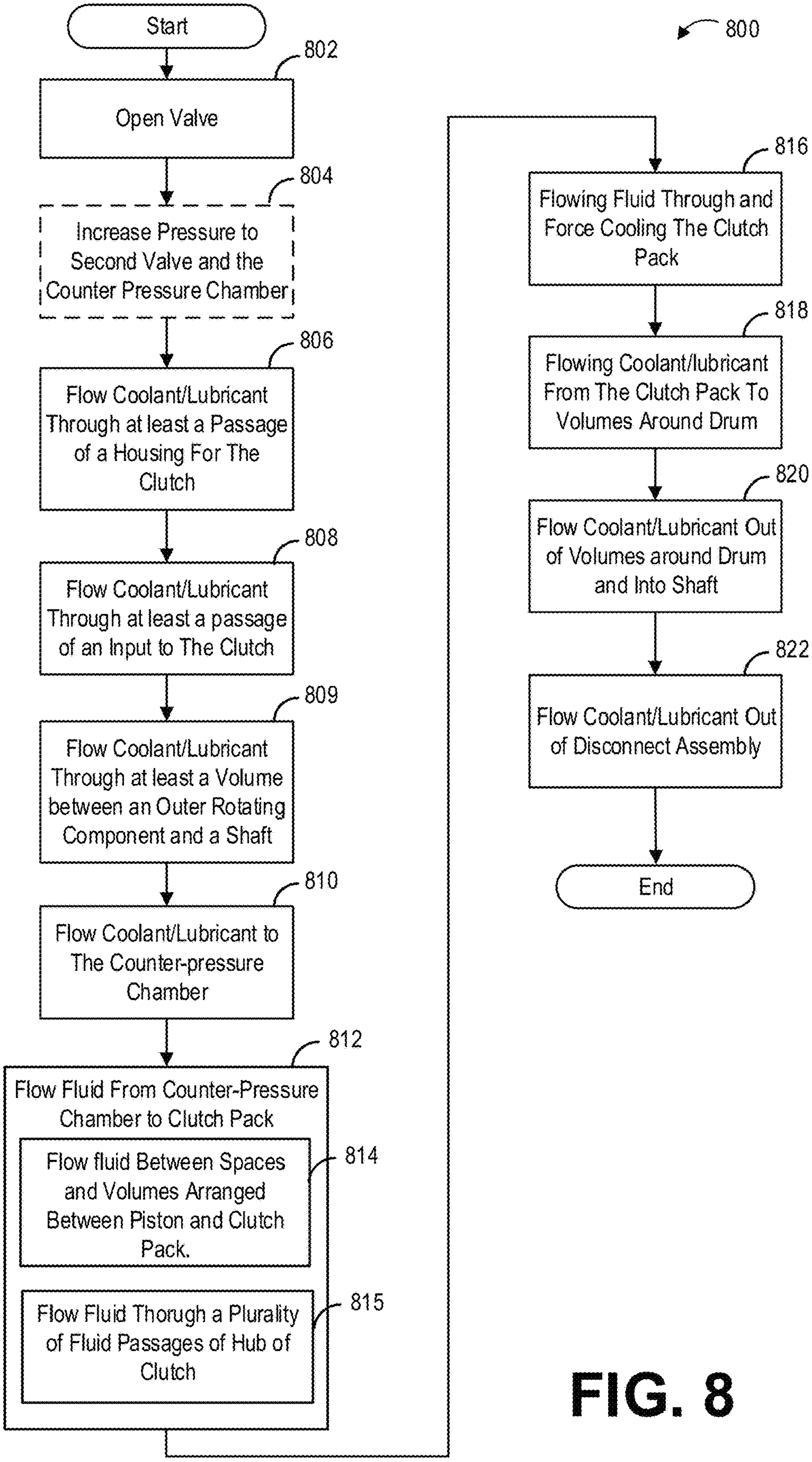
FIG. 8 shows a third method of force cooling a clutch of the PTO.

FIG. 6 shows a first method of advancing a piston and closing a clutch of the PTO. FIG. 7 shows a second method of retracting a piston and closing a clutch of the PTO. FIG. 8 shows a third method of force cooling a clutch of the PTO. The first method of FIG. 6 and the third method of FIG. 8 may be performed in parallel (e.g., approximately simultaneously). Likewise, the third method of FIG. 8 may be performed when the first method of FIG. 6 is complete and the clutch is closed. Further, the second method of FIG. 7 and the third method of FIG. 8 may be performed in parallel.

It is also to be understood that the specific assemblies and systems illustrated in the attached drawings, and described in the following specification are exemplary embodiments of the inventive concepts defined herein. For purposes of discussion, the drawings are described collectively. Thus, like elements may be commonly referred to herein with like reference numerals and may not be re-introduced.

FIGS. 1-2 shows a schematic of an example configuration with relative positioning of the various components. FIGS. 3-5 shows example configurations with approximate position. FIGS. 3-5 are shown approximately to scale; though other relative dimensions may be used. As used herein, the terms "approximately" is construed to mean plus or minus five percent of the range unless otherwise specified.

Further, FIGS. 1-5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. Moreover, the components may be described as they relate to reference axes included in the drawings.

Features described as axial may be approximately parallel with an axis referenced unless otherwise specified. Features described as counter-axial may be approximately perpendicular to the axis referenced unless otherwise specified. Features described as radial may circumferentially surround or extend outward from an axis, such as the axis referenced, or a component or feature described prior as being radial to a referenced axis, unless otherwise specified.

Features described as longitudinal may be approximately parallel with an axis that is longitudinal. A lateral axis may be normal to a longitudinal axis and a vertical axis. Features described as lateral may be approximately parallel with the lateral axis. A vertical axis may be normal to a lateral axis and a longitudinal axis. Features described as vertical may be approximately parallel with a vertical axis.

Turning now to FIG. 1, a vehicle 100 is shown comprising a powertrain 101 and a drivetrain 103. The vehicle 100 may have a front end 132 and a rear end 134, located on opposite sides of vehicle 100. Objects, components, and features of the vehicle 100 referred to as being located near the front may be closest to the front end 132 compared to the rear end 134. Objects, components, and features of the vehicle 100 referred to as being located near the rear may be closest to the rear end 134 compared to the front end 132. The vehicle 100 may have a longitudinal axis 130. The powertrain 101 and drivetrain 103 may each have a length parallel with the longitudinal axis 130.

The powertrain 101 includes a prime mover 106 and a transmission 108. For an example the prime mover 106 may be an internal combustion engine (ICE). For another example the prime mover 106 may be an electric machine, such as an electric motor or an electric motor generator. The prime mover 106 is operated to provide rotary power to the transmission 108. The transmission 108 may be any type of transmission, such as a manual transmission, an automatic transmission, or a continuously variable transmission. Additionally, the transmission 108 may be or include a gearbox. The transmission 108 receives the rotary power produced by the prime mover 106 as an input and outputs rotary power to the drivetrain 103 in accordance with a selected gear or setting.

There may be other movers that may drive and be housed by vehicle 100 besides prime mover 106. For example, if the prime mover 106 is an ICE there may be a second mover 120 with an input to the transmission 108, where the second mover may be an electric machine, such as an electric motor or electric motor generator. If the vehicle 100 includes the second mover 120 or other movers in addition to the prime mover 106, the vehicle 100 may be a hybrid vehicle, wherein there are multiple torque inputs to the transmission 108.

The prime mover 106 may be powered via energy from an energy storage device 105. In one example, the energy storage device 105 is a battery, such as a traction battery, configured to store electrical energy. An inverter 107 may be arranged between the energy storage device 105 and the prime mover 106 and configured to adjust direct current (DC) to alternating current (AC). The inverter 107 may include a variety of components and circuitry with thermal demands that effect an efficiency of the inverter.

The vehicle 100 may be a commercial vehicle, light, medium, or heavy duty vehicle, a passenger vehicle, an off-highway vehicle, a commercial vehicle, agricultural vehicle, and/or sport utility vehicle. For an example embodiment, the vehicle 100 may be a wheeled vehicle, such as an automobile. However, additionally or alternatively, the vehicle 100 may be plane, a boat, or other vehicle system that utilizes lubricant. Additionally or alternatively, the vehicle 100 and/or one or more of its components, such as components of the powertrain 101 and/or drivetrain 103, may be used in industrial, locomotive, military, agricultural, and/or aerospace applications. In one example, the vehicle 100 is an all-electric vehicle or a vehicle with all-electric modes of operation, such as a plug-in hybrid vehicle. As such, the prime mover 106 may be an electric machine. In one example, the prime mover 106 may be an electric motor/generator.

In some examples, such as shown in FIG. 1, the drivetrain 103 includes a first axle assembly 102 and a second axle assembly 112. The first axle assembly 102 may be configured to drive a first set of wheels 104, and the second axle assembly 112 may be configured to drive a second set of wheels 114. In one example, the first axle assembly 102 is arranged near a front of the vehicle 100 and thereby comprises a front axle, and the second axle assembly 112 is arranged near a rear of the vehicle 100 and thereby comprises a rear axle. The drivetrain 103 is shown in a four-wheel drive configuration, although other configurations are possible. For example, the drivetrain 103 may include a rear-wheel drive or an all-wheel drive configuration. Further, the drivetrain 103 may include one or more tandem axle assemblies. As such, the drivetrain 103 may have other configurations without departing from the scope of this disclosure, and the configuration shown in FIG. 1 is provided for illustration, not limitation. Further, the vehicle 100 may include additional wheels that are not coupled to the drivetrain 103.

In some configurations, such as shown in FIG. 1, the drivetrain 103 includes a transfer case 110 configured to receive rotary power output by the transmission 108. A first driveshaft 113 is drivingly coupled to a first output 111 of the transfer case 110, while a second driveshaft 122 is drivingly coupled to a second output 121 of the transfer case 110. The first driveshaft 113 (e.g., a front driveshaft) transmits rotary power from the transfer case 110 to a first differential 116 of the first axle assembly 102 to drive the first set of wheels 104, while the second driveshaft 122 (e.g., a rear driveshaft) transmits the rotary power from the transfer case 110 to a second differential 126 of the second axle assembly 112 to drive the second set of wheels 114. For example, the first differential 116 is drivingly coupled to a first set of axle shafts 118 coupled to the first set of wheels 104, and the second differential 126 is drivingly coupled to a second set of axle shafts 128 coupled to the second set of wheels 114. It may be appreciated that each of the first set of axle shafts 118 and the second set of axle shafts 128 may be positioned in a housing. The first driveshaft 113 and second driveshaft 122 may be positioned to extend in parallel with the longitudinal axis 130. For an example of a configuration of vehicle 100, the second driveshaft 122 may be centered about the longitudinal axis 130.

The first differential 116 may supply a FWD in some capacity to vehicle 100, as part of rotary power transferred via the first driveshaft 113. Likewise, the second differential 126 may supply a RWD to the vehicle 100, as part of the rotary power transferred via the second driveshaft 122. The first differential 116 and the second differential 126 may supply a FWD and RWD, respectively, as part of an AWD mode for vehicle 100.

The transmission 108 and transfer case 110 may share and be housed via a common housing assembly. The transmission 108 and the transfer case 110, may be mounted to an axle assembly, such as the first or second axle assemblies 102, 112. The transmission 108 and transfer case 110 may share a common housing with a differential. Additionally or alternatively, the transmission 108 and transfer case 110 may be mounted to a differential via the common housing or specific housings. The first differential 116 may be housed in a first common housing, where the first common housing houses a transmission and transfer case, such as the transmission 108 and the transfer case 110. Alternatively, a housing for the first differential 116 may physically couple to a second common housing, where the second common housing houses a transmission and transfer case, such as the transmission 108 and the transfer case 110. The second differential 126 may be housed in a third common housing, where the third common housing houses a transmission and transfer case, such as the transmission 108 and the transfer case 110. Alternatively, a housing for the second differential 126 may physically couple to a fourth common housing, where the fourth common housing houses a transmission and transfer case, such as the transmission 108 and the transfer case 110.

The vehicle 100 may include a PTO device 144. The PTO device 144 may be an implement, that may be driven by the vehicle 100. For one or more examples, the PTO device 144 may be a pump, a blower, an air conditioning (AC) unit, a generator, a drill, or another rotational element/implement driven via power generated from the vehicle 100. The PTO device 144 may be driven via power and rotational energy transferred via torque from the movers of the vehicle 100, such as the prime mover 106 and the second mover 120. For an example, power and rotational energy as torque may be transferred to the PTO device 144 via the transmission 108. The transmission 108 may drivingly couple to the PTO device 144 via an input 146, where the input 146 may be a rotational element that is an output of the transmission 108 and an input to the PTO device 144. The input 146 may be a shaft. The transmission 108 may include a PTO assembly 142, such as a PTO reduction set, such as a PTO gearset. The PTO assembly 142 may drivingly couple the input 146, such as to output power and rotational energy via torque to the PTO assembly 142. The PTO assembly 142 may increase the torque and decrease the rotational speed to the input 146 from an input of the prime mover 106 and second mover 120 or another rotational element of the transmission 108. The PTO assembly 142 may include a plurality of reducers, such as gears.

Adjustment of the drivetrain 103 between the various modes as well as control of operations within each mode may be executed based on a vehicle control system 154, including a controller 156. Controller 156 may be a microcomputer, including elements such as a microprocessor unit, input/output ports, an electronic storage medium for executable programs and calibration values, e.g., a read-only memory chip, random access memory, keep alive memory, and a data bus. The storage medium can be programmed with computer readable data representing instructions executable by a processor for performing the methods described below as well as other variants that are anticipated but not specifically listed. In one example, controller 156 may be a powertrain control module (PCM).

Controller 156 may receive various signals from sensors 158 coupled to various regions of vehicle 100. For example, the sensors 158 may include sensors at the prime mover 106 or another mover to measure mover speed and mover temperature, a pedal position sensor to detect a depression of an operator-actuated pedal, such as an accelerator pedal or a brake pedal, a lever position sensor to detect a shifting of a lever, such as a brake lever, speed sensors at the first and second set of wheels 104, 114, etc. Upon receiving the signals from the various sensors 158 of FIG. 1, controller 156 processes the received signals, and employs various actuators 160 of vehicle 100 to adjust drivetrain operations based on the received signals and instructions stored on the memory of controller 156. For example, controller 156 may receive an indication of depression of the brake pedal, signaling a desire for decreased vehicle speed. Vehicle braking may be directly proportional to accelerator pedal position, for example, degree of depression. For another example, controller 156 may receive an indication of depression of the accelerator pedal, signaling a desire for increased vehicle speed. Vehicle acceleration may be directly proportional to accelerator pedal position, for example, degree of depression. In response, the controller 156 may command operations, such as shifting gear modes of the transmission 108. Alternatively, the gear modes of the transmission 108 may be shifted manually, such as if the transmission 108 is a manual transmission.

In some examples, additionally or alternatively, the vehicle 100 may be a hybrid vehicle including both an engine an electric machine each configured to supply power to one or more of the first axle assembly 102 and the second axle assembly 112. For example, one or both of the first axle assembly 102 and the second axle assembly 112 may be driven via power originating from the engine in a first operating mode where the electric machine is not operated to provide power (e.g., an engine-only mode), via power originating from the electric machine in a second operating mode where the engine is not operated to provide power (e.g., an electric-only mode), and via power originating from both the engine and the electric machine in a third operating mode (e.g., an electric assist mode). As another example, one or both of the first axle assembly 102 and the second axle assembly 112 may be an electric axle assembly configured to be driven by an integrated electric machine.

In some embodiments, additionally or alternatively, the transmission 108 may be a first transmission, and the vehicle 100 may have a second transmission arranged on the second set of axle shafts 128. The transmission 108 may be a gearbox. Alternatively, the transmission 108 may be an axle transmission or a trans axle transmission.

Turning to FIG. 2, a schematic 200 of a transmission system 202 is shown. FIG. 2 shows a schematic example of a transmission system 202. The transmission system 202 includes the transmission 108 and at least a mover 210. The mover 210 may be the prime mover 106 or the second mover 120 of FIG. 1. The mover 210 may be an electric machine, such as an electric motor or an electric motor/generator. The mover 210 may drivingly couple and input torque to the transmission 108. The transmission system 202 may also include a first PTO device 204 and/or a second PTO device 206. The first PTO device 204 and/or second PTO device 206 may drive couple and be driven via the transmission 108.

The transmission 108 may include a plurality of reduction sets or reduction stages, such as gearsets, that are of different ratios, where a reduction set or reduction stage of a different ratio than another reduction set or another reduction stage may output a different rotational speed and torque with the same input torque. For example, the transmission 108 may include at least a reduction assembly 208. The reduction assembly 208 may be a plurality of reduction sets, such as gearsets, of different ratios. The reduction assembly 208 may include a plurality of shafts, such as at least two shafts, or other rotational elements that may be drivingly coupled via the reduction sets the reduction assembly 208 includes. The first PTO device 204 may drivingly couple the transmission 108 to receive power upstream of the reduction assembly 208. The second PTO device 206 may drivingly couple the transmission 108 to receive power downstream of the reduction assembly 208.

The mover 210 may drivingly couple the transmission 108, such as to transfer power and rotational energy to the gear assemblies of gearsets and/or other assemblies of reduction sets using non-gear reducers. The transmission 108 has at least an input 216 (e.g., a transmission input). The input 216 may be a shaft (e.g., an input shaft). The mover 210 may drivingly couple the transmission 108 via an output 214 and the input 216. The output 214 is the output of the mover 210 (e.g., a mover output, such as an ICE output or a motor output). The mover 210 may drivingly couple the reduction assembly 208. The mover 210 may drivingly couple the reduction assembly 208 via the input 216 and an input to the reduction assembly 208, such as a shaft.

The transmission 108 may have a plurality of outputs including a first output 218, a second output 220, and a third output 222. The first output 218, the second output 220, and the third output 222, may be shafts (e.g., output shafts). The second output 220 and the third output 222 may drivingly couple to the first PTO device 204 and the second PTO device 206, respectively. For a first example, the first output 218 may be the first output 111 or the second output 121 of FIG. 1. For an example, the first output 218 may drivingly couple to a drive shaft, such as the first driveshaft 113 or the second driveshaft 122 of FIG. 1. For this example, the first output 218 may be the first output 111 or the second output 121 of FIG. 1. Alternatively, for another example the first output 218 may be a driveshaft, such as the first driveshaft 113 or the second driveshaft 122.

Components of the transmission system 202 that may be drivingly coupled indirectly, such as through one or more rotational elements, or are shown not touching are drivingly coupled via a plurality of drive couplings 224. The drive couplings 224 are not a feature of a component, but rather a representation of a feature or component being drivingly coupled to another feature or component indirectly. The drive couplings 224 may be represented via a plurality of dotted lines. For example, the output 214 may be drivingly coupled to the input 216 via a drive coupling of the drive couplings 224.

The reduction assembly 208 may receive torque and be driven via a first shaft 232. The first shaft 232 may be an input to the reduction assembly 208. The first shaft 232 may drivingly couple and be driven via the input 216. The reduction assembly 208 may output torque to and drive a second shaft 234. The second shaft 234 may be an output shaft from the reduction assembly 208. The second shaft 234 may drivingly couple and drive the first output 218. The first shaft 232 and second shaft 234 may be drivingly coupled via the reduction sets of the reduction assembly 208. As the reduction assembly 208 changes between ratios of reductions sets, the reduction assembly 208 may change the speed and torque at the first output 218. The transmission 108 may be of a multi-shaft scheme, wherein the reduction assembly 208 has a plurality of shafts that include the first shaft 232 and the second shaft 234. The reduction assembly 208 may have shafts in addition to the first shaft 232 and the second shaft 234.

In addition to the reduction assembly 208, the transmission 108 may include a first reduction set 236 and/or a second reduction set 238. The first reduction set 236 and second reduction set 238 are PTO reduction sets that may output power to a PTO. The first reduction set 236 may output power to the first PTO device 204. The second reduction set 238 may output power to the second PTO device 206.

The first reduction set 236 may drivingly couple the input 216 and a third shaft 244, and the first reduction set 236 may drivingly couple the input 216 to the third shaft 244. The input 216 may be an input to the first reduction set 236, and input rotational energy via torque to the first reduction set 236. The third shaft 244 may be an output for the first reduction set 236, and may output rotational energy via torque from the first reduction set 236. The third shaft 244 may drivingly couple to the second output 220, such as via a first disconnect 242. The first disconnect 242 selectively and rotationally couple the third shaft 244 to the second output 220. The third shaft 244 may be or may physically couple to an input to the first disconnect 242, and the second output 220 may be or may physically couple to an output from first disconnect 242. Further, the third shaft 244 may rigidly couple the input to the first disconnect 242, such as via physically coupling to the input of the first disconnect 242. Likewise, the second output 220 may rigidly couple to an output from the first disconnect 242, such as via physically coupling to the output from the first disconnect 242.

The second reduction set 238 may drivingly couple the second shaft 234 and a fourth shaft 248, and the second reduction set 238 may drivingly couple the fourth shaft 248 to the second shaft 234. The second shaft 234 may be an input to the second reduction set 238, and input rotational energy via torque to the second reduction set 238. The fourth shaft 248 may be an output for the second reduction set 238, and may output rotational energy via torque from the second reduction set 238. The fourth shaft 248 may drivingly couple to the third output 222, such as via a second disconnect 246. The second disconnect 246 may selectively and rotationally couple the fourth shaft 248 to the third output 222. The fourth shaft 248 may be or may physically couple an input to the second disconnect 246, and the third output 222 may be or may physically couple to an output from first disconnect 242. Further, the fourth shaft 248 may rigidly couple the input to the second disconnect 246, such as via physically coupling to the input of the second disconnect 246. Likewise, the third output 222 may rigidly couple to an output from the second disconnect 246, such as via physically coupling to the output from the second disconnect 246.

The transmission 108 may include a third disconnect 252 and a fourth disconnect 254. The third disconnect 252 may selectively and drivingly couple the input 216 to the first shaft 232. The input 216 may be or may physically couple an input to the third disconnect 252, and the first shaft 232 may be or may physically couple to an output from the third disconnect 252. Further, the input 216 may rigidly couple the third disconnect 252, such as via physically coupling to the input of the third disconnect 252. Likewise, the first shaft 232 may rigidly couple to an output from the third disconnect 252, such as via physically coupling to the output of the third disconnect 252. Likewise, the fourth disconnect 254 may selectively couple and drivingly couple the second shaft 234 to a fifth shaft 256. The second shaft 234 may be or may physically couple to an input to the fourth disconnect 254, and the fifth shaft 256 may be or may physically couple to an output from the third disconnect 252. Further, the second shaft 234 may rigidly couple the fourth disconnect 254, such as via physically coupling to the input of the fourth disconnect 254. Likewise, the fifth shaft 256 may rigidly couple to an output from the third disconnect 252, such as via physically coupling to the output of the fourth disconnect 254. The fifth shaft 256 may drivingly couple the first output 218. Alternatively, the fifth shaft 256 and the first output 218 may be a common shaft or rigidly coupled to act as a unitary structure.

The first disconnect 242, the second disconnect 246, the third disconnect 252, and the fourth disconnect 254 may have at least two modes, an open mode and a closed mode. When open in the open mode, the first disconnect 242, the second disconnect 246, the third disconnect 252, and the fourth disconnect 254 may be prevented from selectively and rotationally coupling their respective inputs and outputs. When closed in the closed mode, the first disconnect 242, the second disconnect 246, the third disconnect 252, and the fourth disconnect 254 may selectively and rotationally couple their respective inputs and outputs.

The first disconnect 242, the second disconnect 246, the third disconnect 252, the fourth disconnect 254, and/or other disconnects of the present disclosure may be normally closed or normally open during the operations of a vehicle, such as the vehicle 100, that houses and may be driven via the transmission 108. For example, for a vehicle where the first PTO device 204 is desired or requested to operate, and the vehicle remains in place and not driven under power during normal operations, the first disconnect 242 may be normally closed while the third disconnect 252 may be normally open. Likewise, for another example, for another vehicle where the first PTO device 204 is not desired or requested to operate and the vehicle drives under power during normal operations, the first disconnect 242 may be normally open while the third disconnect 252 may be normally closed. For another example, there may be another vehicle where the second PTO device 206 is desired or requested to operate and the vehicle may remain in place and not driven under power during normal operations, the second disconnect 246 may be normally closed while the fourth disconnect 254 may be normally open. Likewise, for another example, there may be another vehicle where the second PTO device 206 is not desired or requested to operate and the vehicle drives under power during normal operation, the second disconnect 246 may be normally open while the fourth disconnect 254 may be normally closed.

Likewise, the first disconnect 242, the second disconnect 246, the third disconnect 252, the fourth disconnect 254, and/or other disconnects of the present disclosure may be normally closed or normally open during the PTO operations of a PTO. The PTO may include a PTO device and the PTO reduction set, such as the first PTO device 204 and first reduction set 236 and/or the second PTO device 206 and second reduction set 238. For example, during a PTO operation of a first PTO that includes the first PTO device 204 and the first reduction set 236, the first disconnect 242 may be normally closed and the third disconnect 252 may be normally open. For another example, during a PTO operation of a second PTO that includes the second PTO device 206 and the second reduction set 238, the second disconnect 246 may be normally closed and the fourth disconnect 254 may be normally open.

The first disconnect 242, the second disconnect 246, the third disconnect 252, the fourth disconnect 254, and/or other disconnects of the present disclosure may be closed hydraulically. A pressure adjustment device 282 may be fluidly couple and supply pressure to close the clutches of the first disconnect 242, the second disconnect 246, the third disconnect 252, the fourth disconnect 254, and/or other disconnects of the present disclosure. The pressure adjustment device 282 may be fluidly coupled to the first disconnect 242, the second disconnect 246, the third disconnect 252, the fourth disconnect 254, and/or other disconnects via a plurality of fluid lines 284. More specifically at least a pair of valves may place each of the clutches of the first disconnect 242, the second disconnect 246, the third disconnect 252, the fourth disconnect 254, and/or other disconnects of the present disclosure in fluid communication with the one or more of the fluid lines 284 and the pressure adjustment device 282. Pressure and fluid flow may be transported through fluid lines 284.

For an example, the pressure adjustment device 282 may be a pump. For another example, the pressure adjustment device 282 may be a pressure intensifier. For a further example, the pressure adjustment device 282 may be a pressure booster. For an additional example, the pressure adjustment device 282 may be another pressure adjustment device or a system of smaller pressure adjustment devices therein that may include two or more of a pump, a pressure intensifier, and/or a pressure booster.

The first reduction set 236 may be a gearset. As a gearset, the first reduction set 236 may have at least two gears, including a first gear 262 and a second gear 264. The first gear 262 may be an input gear for the first reduction set 236. The first gear 262 may rotationally couple to the input 216. Alternatively, the first gear 262 may rotationally couple to a shaft or another rotational element that may couple to the input 216 and is upstream with respect to power from the reduction assembly 208. The second gear 264 may be an output gear for the first reduction set. The second gear 264 may rotationally couple to the third shaft 244. The first gear 262 may drive the second gear 264. Additionally, for an example, the first reduction set 236 may have a third gear 266. The third gear 266 may be an idler gear in mesh between the first gear 262 and the second gear 264. As an idler gear, the third gear 266 may rotate in mesh with the first gear 262 and the second gear 264, such that the first gear 262 and the second gear 264 rotate in the same direction. For this example, when driven, the third shaft 244 may rotate in the same direction as the input 216 via the first reduction set 236.

It is to be appreciated that for another example, the first reduction set 236 may not have an idler gear and may be of a configuration with the first gear 262 and the second gear 264 in mesh, or be of another configuration with an even amount of gears. When in mesh without an idler gear between, the first gear 262 and the second gear 264 may rotate in opposite directions. Likewise, for a further example, for a configuration of the first reduction set 236 with an even amount of gears between the first gear 262 and the second gear 264, the first gear 262 and the second gear 264 may rotate in opposite directions. For these example, when driven, the third shaft 244 may rotate in a second direction opposite to a first direction the input 216 rotates.

The second reduction set 238 may be a gearset. As a gearset, the second reduction set 238 may have at least two gears including a fourth gear 272 and a fifth gear 274. The fourth gear 272 may be an input gear for the second reduction set 238. The fourth gear 272 may rotationally couple to the second shaft 234. The fifth gear 274 may be an output gear for the first reduction set. The fifth gear 274 may rotationally couple to the fourth shaft 248. The fourth gear 272 may drive the fifth gear 274. Additionally, for an example, the second reduction set 238 may have a sixth gear 276. The sixth gear 276 may be an idler gear in mesh between the fourth gear 272 and the fifth gear 274. As an idler gear, the sixth gear 276 may rotate in mesh with the fourth gear 272 and the fifth gear 274, such that the fourth gear 272 and the fifth gear 274 rotate in the same direction. For this example, when driven, the fourth shaft 248 may rotate in the same direction as the second shaft 234 via the second reduction set 238.

It is to be appreciated that for another example, the second reduction set 238 may not have an idler gear and may be of a configuration with the fourth gear 272 and the fifth gear 274 in mesh, or be of another configuration with an even amount of gears. When in mesh without an idler gear between, the fourth gear 272 and the fifth gear 274 may rotate in opposite directions. Likewise, for a further example, for a configuration of the second reduction set 238 with an even amount of gears between the fourth gear 272 and the fifth gear 274, the fourth gear 272 and the fifth gear 274 may rotate in opposite directions. For these examples, when driven, the fourth shaft 248 may rotate in a second direction opposite to a first direction the second shaft 234 rotates.

A set of reference axes 301 are provided for comparison between views shown in FIG. 3. The reference axes 301 indicate a y-axis, an x-axis, and a z-axis. In one example, the z-axis may be parallel with a direction of gravity, and the x-y plane may be parallel with a horizontal plane that a disconnect assembly 302 of FIG. 2 may rest upon. When referencing direction, positive may refer to in the direction of the arrow of the y-axis, x-axis, and z-axis and negative may refer to in the opposite direction of the arrow of the y-axis, x-axis, and z-axis. A circle may represent an axis of the reference axes 301 that is normal to a view. A circle may represent an axis of the reference axes 301 that is normal to a view. A filled circle may represent an arrow and axis facing toward, or positive to, a view. An unfilled circle may represent an arrow and an axis facing away, or negative to, a view.

Turning to FIG. 3, it shows a view 300 of a disconnect assembly 302. Disconnects that are of the configuration of disconnect assembly 302 may be used as the first disconnect 242, the second disconnect 246, the third disconnect 252, or the fourth disconnect 254 of FIG. 2. The disconnect assembly 302 may have a first side 304 and a second side 306, where the first side 304 is opposite the second side 306. The disconnect assembly 302 may be centered around a central axis, such as an axis 307 or another axis parallel therewith, such that components of the disconnect assembly may be positioned radially around the central axis. The axis 307 may be a longitudinal axis for the disconnect assembly 302. The axis 307 or another example of the central axis of the disconnect assembly 302 may be a rotational axis for the disconnect assembly 302. The disconnect assembly 302 may include a housing 308, a clutch 310, an input 314, and an output 316.

The housing 308 may have two sections: a first section 309 and a second section 311. The first section 309 and the second section 311 are separate pieces of the housing 308. The first section 309 may include and be closest to the first side 304. The second section 311 may include and be closest to the second side 306. The housing 308 may have a first cavity 312. The first cavity 312 may house the clutch 310. A second cavity 321 may be created between the input 314 and the output 316.

The clutch 310 is a wet clutch, where components of the clutch 310, such as a clutch pack and clutch plates, may be immersed in fluid that is a lubricant and coolant during operations. The clutch 310 includes a first rotating component and a second rotating component. The first rotating component may be an outer rotating component 318 and the second rotating component may be an inner rotating component 320, where the outer rotating component 318 includes or physically couples to first features that are positioned about and rotate around second features of or that are physically coupled to the inner rotating component 320. The outer rotating component 318 may include or physically couple to a drum 322. The first features may include the drum 322. The outer rotating component 318 may include an extension 326. The drum 322 may be outward, with respect to the axis 307, from the extension 326. The drum 322 may be radially outward from the extension 326. The drum 322 may curve about, such as radially around, the extension 326. The inner rotating component 320 may include or physically couple to a hub 324. The second features may include the hub 324. The drum 322 may be positioned around the hub 324, such as radially around the hub 324. The hub 324 may be positioned around the extension 326, such as radially around the extension 326. The input 314 may drivingly couple and physically couple to the outer rotating component 318. The output 316 may drivingly couple to the inner rotating component 320. The input 314 and the outer rotating component 318 may be nearest to the first side 304. The output 316 and the inner rotating component 320 may be nearest to the second side 306. The housing 308 may be positioned about the input 314 and the output 316. The first section 309 may be positioned about, such as around, the outer rotating component 318. The outer rotating component 318 may be positioned about, such as around, such as radially around, the input 314. Likewise, the second section 311 may be positioned about, such as around, the inner rotating component 320. The inner rotating component 320 may be positioned about, such as around, such as radially around, the output 316.

The outer rotating component 318 includes a third cavity 328. The drum 322 may curve around a third cavity 328. Likewise, the inner rotating component 320 may include a fourth cavity 330. The hub 324 may curve around at least a section of the fourth cavity 330. The drum 322 may be positioned about the hub 324, such that portions of the hub 324 may be housed in the third cavity 328.

The housing 308 and the first cavity 312 may be fluidly sealed (e.g., be fluid tight) via a plurality of seals, such that fluid may not exit the housing 308 to an exterior of the first cavity 312. The seals may include at least a first seal 332 and a second seal 334. The first seal 332 may be at the first side 304 and the second seal 334 may be at the second side 306. The first seal 332 may be between and create a fluid tight seal between the input 314 and the housing 308. More specifically, the first seal 332 may be between and create a fluid tight seal between the outer rotating component 318 and the first section 309. The second seal 334 may be between and create a fluid tight seal between the output 316 and the housing 308. More specifically, the second seal 334 may be between and create a fluid tight seal between the inner rotating component 320 and the second section 311. The seals may include fastening components, where the first seal 332 is complementary to a first fastening component 336, and the second seal is complementary to a second fastening component 338. The seals may include piston rings, where the first seal 332 is or is complementary to a first piston ring, and the second seal 334 is or is complementary to a second piston ring. The first piston ring may fluidly seal the outer rotating component 318 and/or the input 314 with the housing 308. The second piston ring may fluidly seal the inner rotating component 320 and/or the output 316 with the housing 308.

A plurality of bearings may support the input 314 and the outer rotating component 318, such as a plurality of bearings of a first bearing assembly 342 and a second bearing assembly 344. The first bearing assembly 342 and the second bearing assembly 344 may each include a plurality of bearings; such as ball bearings. The first and second bearing assemblies 342, 344 may be positioned around the outer rotating component 318. The first and second bearing assemblies 342, 344 may allow the input 314 and the outer rotating component 318 to rotate freely of the housing 308.

A plurality of bearings may support the output 316 and the inner rotating component 320, such as a plurality of bearings of a third bearing assembly 346 and a fourth bearing assembly 348. The third bearing assembly 346 and the fourth bearing assembly 348 may each include a plurality of bearings; such as ball bearings. The third and fourth bearing assemblies 346, 348 may be positioned around the inner rotating component 320. The third and fourth bearing assemblies 346, 348 may allow the output 316 and the inner rotating component 320 to rotate freely of the housing 308.

The clutch 310 may further include the drum 322, the hub 324, a piston 358, a clutch pack 356, and at least a spring 362. The drum 322 may curve about the piston 358 and the clutch pack 356, such as radially about the piston 358 and clutch pack 356. The spring 362 may be housed and mechanically supported by a carrier component 360. The hub 324 may curve about the carrier component 360, such as radially about the carrier component 360. More specifically, the hub 324 may curve radially around the carrier component 360. The piston 358, the carrier component 360, and the spring 362 may be positioned about the extension 326, such as radially about the extension 326. More specifically, the piston 358, the carrier component 360, and the spring 362 may be positioned radially around the extension 326.

The outer rotating component 318 may have a first surface 352 that is normal to the axis 307. The inner rotating component 320 may have a second surface 354 normal to the axis 307. The second surface 354 may be or may be part of a counter hole extending radially from a section 355 of the fourth cavity 330. The section 355 has a smaller diameter than the inner diameter of the hub 324 that curves around the spring 362.

The piston 358 may be sandwiched between the first surface 352 and the clutch pack 356. Likewise, the piston 358 may be sandwiched between the first surface 352 and the carrier component 360, where the piston 358 may be sandwiched between the first surface 352 and the spring 362. Additionally or alternatively, there may be a plurality of springs housed via the fourth cavity 330 and the carrier component 360, including one or more of the spring 362.

The clutch pack 356 may include a plurality of separator plates 366 and a plurality of friction plates 368. The clutch pack 356 may also include an end plate 364. The hub 324 may include the friction plates 368 physically coupled thereto. The drum 322 may include the separator plates 366 physically coupled thereto. The end plate 364 may physically couple to the drum 322. A force in a longitudinal direction may close the clutch pack 356 via pressing the friction plates 368 into surface sharing contact with the separator plates 366. For example, force from the piston 358 abutting and pressing against the clutch pack 356 above a threshold of force may close the clutch pack 356. The force from the piston 358 may be longitudinal and in a direction toward the second side 306.

An actuation chamber 372 may be formed between the first surface 352 and the piston 358. A counter-pressure chamber 374 may be formed between the piston 358 and the inner rotating component 320. A spring 362 may be housed in counter-pressure chamber 374. The actuation chamber 372 and the counter-pressure chamber 374 may each house fluid. The actuation chamber 372 may be a chamber that receives and is pressurized by work fluid to change the state of the clutch. Increasing fluid pressure to the actuation chamber 372 may advance the clutch in the direction of the second side 306. Upon advancing a first threshold of distance, the piston 358 may press upon and apply force to the clutch pack 356. The application of force from the pressing of the piston 358 to the clutch pack 356 may compress the clutch pack 356. Compression of the clutch pack 356 may press the friction plates 368 to abut and make surface contact with the separator plates 366, causing the clutch 310 to engage in a closed state.

The spring 362 in the counter-pressure chamber 374 may resist the advancement of the piston 358, where the spring 362 may apply a resistive force via a spring force opposite to the direction of engagement for the piston 358. For example, the spring 362 may apply a resistive force a direction toward the first side 304. The spring 362 and other springs of the counter-pressure chamber 374 may be one or more return springs that may return the piston to a position in the direction of the first side 304, such as if the pressure of the actuation chamber 372 is decreased. Likewise, fluid, such as lubricant and/or coolant, housed via the counter-pressure chamber 374 may apply a resistive force via pressure opposite to the direction of engagement for the piston 358.

Decreasing the pressure to the actuation chamber 372 may advance the clutch in the direction of the first side 304, as the resistive forces of the spring 362 and fluid in the counter-pressure chamber 374 become greater than the force of fluid in the actuation chamber 372 places on the piston 358.

Advancing the piston 358 in the direction of the first side 304 may reduce or remove force placed by the piston 358 to the clutch pack. The reduction or removal of force from the piston 358 to the clutch pack 356, may expand the clutch pack 356. Expansion of the clutch pack 356 may allow friction plates 368 to expand from the separator plates 366, causing the clutch 310 to disengage and enter an open state (e.g., opening the clutch 310).

When the disconnect assembly 302 is closed, the clutch 310 is in a closed state. Likewise, when the disconnect assembly 302 is open, the clutch 310 is in an open state. When the disconnect assembly 302 is normally closed, the clutch 310 is normally closed. When the disconnect assembly 302 is normally open, the clutch 310 is normally open.

A first distance between the piston 358 and the first surface 352 may be modulated via pressure in the actuation chamber 372, such that the first distance may increase at greater pressure or decrease at lower pressure from a first state of pressure of the actuation chamber 372. A second distance between the piston 358 and the clutch pack 356 may be modulated, such that the piston 358 may press and compress the clutch pack 356 to smaller sizes or release and decompress the clutch pack 356 to a larger size. The second distance may be modulated via pressure of the actuation chamber 372, such that the second distance may decrease at a greater pressure or decrease at a lower pressure from the first state of pressure of the actuation chamber 372. The force the piston 358 may place on the clutch pack 356 may be modulated, such as via the pressure in the actuation chamber 372. The force from the piston 358 to the clutch pack 356 may be increased with a greater pressure and may be decreased with a lower pressure from the first state of pressure of the actuation chamber 372.

The piston 358 may have a fifth cavity 370 and a sixth cavity 371. The fifth cavity 370 may be above the sixth cavity 371. The sixth cavity 371 may be of size such that the hub 324 fit to the sixth cavity 371. As the piston 358 advances in a direction toward the second side 306, the hub 324 may fit to the sixth cavity 371. The fourth cavity 330 may be placed in fluid communication with the clutch pack 356 via the fifth cavity 370 and the sixth cavity 371. Fluid, including lubricant, may flow between the clutch pack 356 and the fourth cavity 330 via the fifth cavity 370 and/or sixth cavity 371. Both the fifth cavity 370 and the sixth cavity 371 may reduce the amount of material for and mass of the piston 358. The sixth cavity 371 may allow the piston 358 to move toward the second side 306, around the hub 324, and into contact with the clutch pack 356, such that the hub 324 is prevented from contacting and blocking the piston 358 before contacting with the clutch pack 356.

Fluid, such as actuation fluid, may flow via a first flow path 376 to the actuation chamber 372 via a first flow path 376. Fluid, such as lubricant, such as oil, may flow via a second flow path 378 to the counter-pressure chamber 374. Actuation fluid housed by and supplied to the actuation chamber 372 via the first flow path 376 may be a lubricant. Likewise, the actuation fluid supplied via the first flow path 376 and the lubricant supplied via the second flow path 378 may be the same type of fluid, such as oil. Alternatively, the actuation fluid supplied via the first flow path 376 and the lubricant supplied via the second flow path 378 may be different types of fluid. The first flow path 376 and second flow path 378 may deliver fluid via an external fluid flow, where fluid may be delivered external to the disconnect assembly 302. The second flow path 378 may be cooled externally of the disconnect assembly 302.

The fluid on the first flow path 376 may travel through a plurality of fluid passages and volumes of the housing 308 and the outer rotating component 318 to the actuation chamber 372. Likewise, fluid on the second flow path 378 may travel through a plurality of fluid passages and volumes of the housing 308 and the outer rotating component 318 to the counter-pressure chamber 374 and to the fourth cavity 330. The housing 308 may have a first passage 382 and a fourth passage 390, where the first section 309 specifically may include the first passage 382 and fourth passage 390. The outer rotating component 318 may include a second passage 384, a third passage 388, a fifth passage 392, and a sixth passage 394. The first passage 382, the second passage 384, the third passage 388, the fourth passage 390, the fifth passage 392, and the sixth passage 394 may be fluid passages, such as fluid lines. The first passage 382, the second passage 384, the third passage 388, the fourth passage 390, the fifth passage 392, and the sixth passage 394 may extend in a radial direction with respect to the axis 307. There may be a plurality of the first passages 382, the second passages 384, the third passages 388, the fourth passages 390, the fifth passages 392, and the sixth passages 394.

The second passage 384 may be fluidly coupled to the third passage 388, such as via an eighth cavity 386 of the outer rotating component 318. The second passage 384 may have a bend 385. The fifth passage 392 may fluidly couple to the sixth passage 394 via a seventh cavity 375. The seventh cavity 375 may be radially between the outer rotating component 318 and the input 314. Fluid housed via the fourth cavity 330 and the counter-pressure chamber 374 may be in fluid communication with the clutch pack 356, such as via the fifth cavity 370 and sixth cavity 371. A third seal 377 may be positioned between, such as radially between, one or more first surfaces of the outer rotating component 318 and one or more second surfaces of the output 316, creating a fluid seal therebetween. Alternatively, the seal 377 may be positioned between the outer rotating component 318 and another rotating element, such as one or more surfaces of the input 314. The seal 377 may be arranged to fluidically seal the seventh cavity 375 from the counter-pressure chamber 374.

Further, the drum assembly 322 may include a plurality of seventh passages 387. Further, the hub 324 may include a plurality of eighth passages 389. The seventh passages 387 may be holes and may extend radially outward and through the drum assembly 322. Likewise, the eighth passages 389 may be holes and may extend radially outward and through the hub 324. Further the seventh passages 387 and the eighth passages 389 may be bores. The seventh passages 387 may place a first volumetric space radially between the drum assembly 322 and the hub 324 in fluid communication (e.g., fluidically couple) with other volumetric spaces of the first cavity 312 around the drum assembly 322. Further, the eighth passages 389 may place the fourth cavity 330 and the counter-pressure chamber 374 in fluidic communication (e.g., fluidically couple) with other volumetric spaces between the drum assembly 322 and the hub 324. The clutch pack 356 may therein be placed in fluidic communication with volumetric spaces between the housing 308 and the drum assembly 322 via the seventh passages 387. Further, the clutch pack 356 may be placed in fluidic communication and be fluidically coupled to the counter-pressure chamber 374 via the eighth passages 389.

Fluid may also exit the counter-pressure chamber 374 and the fourth cavity 330 via the second flow path 378, via a plurality of fluid passages. Fluid may exit the counter-pressure chamber 374 and the fourth cavity 330 via a ninth passage 396. The ninth passage 396 may be included by the output 316. The ninth passage 396 may be in fluid communication with the second cavity 321.

Fluid may flow to and pressurize the actuation chamber 372 via the first flow path 376. For example, fluid following and/or pressurizing the first flow path 376 may flow through housing 308 via the first passage 382. Fluid following and/or pressurizing the first flow path 376 may enter the second passage 384 from the first passage 382. Fluid following and/or pressurizing the first flow path 376 may enter the eighth cavity 386 via the second passage 384. Fluid following and/or pressurizing the first flow path 376 may enter the third passage 388 from the eighth cavity 386. Fluid following and/or pressurizing the first flow path 376 may enter the actuation chamber 372 via the third passage 388. Fluid may also flow from and depressurize the actuation chamber 372 via the first flow path 376. For another example, the removal and/or depressurization of fluid housed via the actuation chamber 372 may be facilitate by fluid following the first flow path 376 in reverse order through fluid passages and other volumes for flowing fluid to and pressurizing the actuation chamber 372. Additionally, fluid may be forced out of and depressurize the actuation chamber 372 along the first flow path 376, via increasing fluid flow and pressure to the counter-pressure chamber 374 via the second flow path 378.

Fluid following the second flow path 378 may flow through housing 308 via the fourth passage 390. Fluid following the second flow path 378 may enter the fifth passage 392 from the fourth passage 390. Fluid following the second flow path 378 may enter the seventh cavity 375 via the fifth passage 392. Fluid following the second flow path 378 may enter the sixth passage 394 via the seventh cavity 375. Fluid following the second flow path 378 may enter the counter-pressure chamber 374 and the fourth cavity 330 via the sixth passage 394. Fluid flowing via second flow path 378 may force cool the clutch 310 from the counter-pressure chamber 374. For example, the fluid from the second flow path 378 may force cool the clutch pack 356 by traveling via volumes between the piston 358 and the hub 324, such as via the fifth cavity 370 and sixth cavity 371. Further, for this or another example, the fluid from the second flow path 378 may force cool the clutch 310 and clutch pack 356 via flowing through the eighth passages 389. The fluid force cooling the clutch pack 356 may exit and flow outward from the clutch pack 356 via the seventh passages 387. The fluid forced outward via the seventh passages 387 along the second flow path 378 may enter spaces of the first cavity 312 around the clutch 310. Fluid following the second flow path 378 may be removed from the first cavity 312 via entering passages and volumes of rotational elements of the disconnect assembly 302 and/or the ninth passage 396. Further, fluid following the second flow path 378 may be removed from the disconnect assembly 302 via the ninth passage 396.

Fluid may be directed to enter and exit the disconnect assembly 302 and fluid passages and volumes of the disconnect assembly via a valve or a plurality of valves. There may be a valve specific to each flow path, with a first valve for the first flow path 376 and a second valve for the second flow path 378. The opening, partial opening, partial closing, and closing of valves may start, increase, decrease, and/or stop, respectively, the volumetric flow of fluid along the first flow path 376 and the second flow path 378.

The valves of and for the disconnect assembly 302 may be isolated or integrated units. For an example, the disconnect assembly 302 may comprise valves that are integrated units. A valve complementary to the disconnect assembly 302, such as a valve to supply fluid to the first flow path 376 or the second flow path 378, may be an integrated valve. Likewise, a plurality of valves complementary to the disconnect assembly 302 may be integrated valves. Additionally or alternatively, a valve complementary to the disconnect assembly 302, such as a valve to supply fluid to the first flow path 376 or the second flow path 378, may be an isolated valve from the disconnect assembly 302. Likewise, a plurality of valves complementary to the disconnect assembly 302 may be isolated valves from the disconnect assembly 302.

The valves of the disconnect assembly 302 may be on-off valves and/or proportional valves, where the proportional valves may allow electronic modulation (soft closing) of the clutch. For an example, one or more of the valves that are on-off valves, may be solenoids or have solenoid components, (e.g., be on-off solenoid valves or have on-off solenoid components). For this or another example, all of the valves that are on-off valves may be solenoids or have solenoid components. Likewise, for these or another example, one or more of the valves that are proportional valves, may be solenoids or have solenoid components, (e.g., be proportional solenoids or have proportional solenoid components). For these or another example, all of the valves that are proportional valves may be proportional solenoids or have proportional solenoid components.

It is to be appreciated, that the view 300 shows a portion of the disconnect assembly 302, and therein there may be other portions and features of the disconnect assembly. For example, the components and their features of the disconnect assembly 302 may be mirrored opposite the axis 307 from the view 300, such as below the axis 307 with respect to the z-axis of the reference axes 301.

Turning to FIG. 4A, it shows the view 400 of a first example of the disconnect assembly 302. The view 400 is the view 300 of the disconnect assembly 302, but including a first set of a plurality of valves that may be in fluidic communication with the actuation chamber 372 and the counter-pressure chamber 374. The first example of the assembly 302, the valves are isolated valves that are external to the housing 308. For example, the valves include a first valve 422 and a second valve 424 that are each an isolated valve external to, but fluidically coupled to, the assembly 302 and the housing 308. The first valve 422 and the second valve 424 are shown schematically.

The first valve 422 may fluidly couple to the first passage 382. The first valve 422 may open to increase or decrease pressure and/or fluid flow to volumes in fluidic communication along the first flow path 376. For example, fluid volumes that receive or remove fluid along the first flow path 376 may be pressurized and/or receive fluid from or depressurized and/or deliver fluid to the first valve 422. For an example, the first valve 422 may be an on-off valve. For another example, the first valve 422 may be a proportional valve, allowing for soft closing of the clutch 310. The first valve 422 may be in fluid communication with a pressure adjustment device, such as the pressure adjustment device 282 of FIG. 2. The pressure adjustment device may supply fluid and hydraulic pressure to the first valve 422.

The second valve 424 may fluidly couple to the fourth passage 390. The second valve 424 may open or close to increase or decrease, respectively, pressure and/or fluid flow to volumes fluidically coupled along the second flow path 378. For example, fluid volumes that receive or remove fluid along the second flow path 378 may be pressurized and/or receive fluid from or depressurized and/or deliver fluid to the second valve 424. For an example, the second valve 424 may be an on-off valve. For another example, the second valve 424 may be a proportional valve, allowing for soft closing of the clutch 310. The second valve 424 may be in fluid communication with a pressure adjustment device, such as the pressure adjustment device 282. The pressure adjustment device may supply fluid and hydraulic pressure to the second valve 424.

Turning to FIG. 4B, it shows the view 450 of a second example of the disconnect assembly 302. The view 450 is the view 300 of the disconnect assembly 302, but including a first set of a plurality of valves that may be in fluidic communication with the actuation chamber 372 and the counter-pressure chamber 374. The second example of the assembly 302, shows the valves are integrated valves that are internal to the housing 308. More specifically, the valves may be housed by and/or rigidly coupled to the housing 308. For example, the valves include a third valve 432 and a fourth valve 434 that are each an integrated valve housed via the housing 308 and included as part of the assembly 302. The third valve 432 and the fourth valve 434 are each fluidically coupled to at least a passage the assembly 302 and the housing 308. The third valve 432 and the fourth valve 434 are shown schematically.

The third valve 432 may fluidly couple to one or more passages of the first flow path 376. For example, the third valve 432 may fluidly couple to the first passage 382 and the second passage 384. The third valve 432 may open to increase or decrease pressure and/or fluid flow to volumes in fluidic communication along the first flow path 376. For example, fluid volumes that receive or remove fluid along the first flow path 376 may be pressurized and/or receive fluid from or depressurized and/or deliver fluid to the third valve 432. For an example, the third valve 432 may be an on-off valve. For another example, the third valve 432 may be a proportional valve, allowing for soft closing of the clutch 310. The third valve 432 may be in fluid communication with a pressure adjustment device, such as the pressure adjustment device 282 of FIG. 2. The pressure adjustment device may supply fluid and hydraulic pressure to the third valve 432.

The fourth valve 434 may fluidically couple to the fourth passage 390. The fourth valve 434 may open or close to increase or decrease, respectively, pressure and/or fluid flow to volumes in fluidic communication along the first flow path 376. For example, fluid volumes that receive or remove fluid. For example, fluid volumes that receive or remove fluid along the second flow path 378 may be pressurized and/or receive fluid from or depressurized and/or deliver fluid to the fourth valve 434. For an example, the fourth valve 434 may be an on-off valve. For another example, the fourth valve 434 may be a proportional valve, allowing for soft closing of the clutch 310. The fourth valve 434 may be in fluid communication with a pressure adjustment device, such as the pressure adjustment device 282. The pressure adjustment device may supply fluid and hydraulic pressure to the fourth valve 434.

Turning to FIG. 5, it shows a view 500 of at least a portion of the piston 358 and the features therein. View 500 is a sectional view of the piston 358. Additionally, view 500 shows the piston 358 separated from other components and features of the assembly 302 of FIG. 3 with exception to one or more seals rigidly coupled and directly coupled thereto. The view 500 also shows an axis 508. The portion of the piston 358 may be arranged around and above the axis 508. The axis 508 may be parallel with the axis 307 of FIG. 3.

The piston 358 has a first side 504 and a second side 506, where the first side 504 is opposite the second side 506. The first side 504 may be an actuation side of the piston 358, wherein the first side 504 may face and shape an actuation chamber, such as the actuation chamber 372 of FIGS. 3-4B. Likewise, the second side 506 may be a counter-pressure side, wherein the second side 506 may face and shape a counter-pressure chamber, such as the counter-pressure chamber 374 of FIGS. 3-4B.

The first side 504 of the piston 358 may include a first cavity 510, a second cavity 512, and a hole 514, where a material 516 of the piston 358 and the surfaces thereof curve around the first cavity 510, the second cavity 512, and the hole 514. The hole 514 may be a through hole. The first cavity 510, the second cavity 512 and the hole 514 are volumetrically connected and continuous. The second cavity 512 and/or the hole 514 may be concentric to the piston 358 and centered, such as radially around a rotational axis, such as the axis 307. The first cavity 510 may be around and outward from the second cavity 512. The first cavity 510 and the second cavity 512 may be undercuts extending into the material 516.

Likewise, the first side 504 of the piston 358 may have a first step 522 and a second step 524. The second step 524 is outward from the first step 522, such as radially outward with respect to the axis 307. The piston 358 may have a valley 520 that curves outward toward the second step 524 and that surfaces of the first and/or second steps 522, 524 are shaped around. Likewise, a piston 358 may have a valley 526 that curves outward toward the first step 522 and that surfaces of the first step 522 are shaped around. The valleys 526, 520 may be referred to herein as the first valley 526 and the second valley 520, respectively. The second step 524 may curve around, such as radially around, the first cavity 510. Further, the first cavity 510 may be an undercut of the second step 524. The first step 522 may curve around, such as radially around, the second cavity 512. Further, the second cavity 512 may be an undercut of the first step 522.

One or more surfaces of the first step 522 that connect to with one or more surfaces of the second step 524 may define the shape of the second valley 520. Said in another way, one or more surfaces of the first step 522 shaping the second valley 520 are contiguous with one or more surfaces of the second step 524. For example, a surface 525 part of the first step 522 may have a first portion normal to the axis 508 and a second portion that curves with and defines the shape of the second valley 520. The second portion of surface 525 may become increasingly curved and radial with respect to a rotational axis of a piston 358 with the shape of the second valley 520 closer toward the second step 524.

The first valley 526 curves toward the first step 522 from a surface 518. Surface 518 connects with one or more surfaces of the first step 522 via the first valley 526, such that surface 518 is contiguous with one or more surfaces of the second step 524. Likewise, surface 518 may define the shape of the first valley 526. Said in another way, the surface 518 shaping the first valley 526 is contiguous with one or more surfaces of the second step 524. For example, the surface 518 may have a first portion normal to the axis 508 and a second portion that curves with and defines the shape of the first valley 526. The second portion of surface 518 may become increasingly curved and radial with respect to a rotational axis of a piston 358 with the shape of the first valley 526 closer toward the first step 522.

The piston 358 may also include a first groove 528 and a second groove 532. The first groove 528 may be included by outward most portion of the piston 358, such as a radially outward portion of the piston 358. Therein, the first groove 528 may face and be open to components outward of the piston 358, such as radially outward. More specifically, the first groove may be incorporated into a support of the piston 358. The second groove 532 may be included by an inward most portion of the piston 358, such as a radially inward portion of the piston. Therein, the second groove 532 may face and be open to components inward of the piston 358, such as radially inward.

A first seal 530 may be fit to the first groove 528. More specifically, the first groove 528 may house the first seal 530 such that the first seal 530 is retained to or rigidly coupled to the piston 358 via the first groove 528. A second seal 534 may be fit to the second groove 532. More specifically, the second groove 532 may house the second seal 534, such that the second seal 534 is retained to or rigidly coupled to the piston 358 via the second groove 532. A first surface 536 may be contiguous with surfaces of the that are around and form the shape of the second groove 532. Likewise, a second surface 538 may be contiguous and connected to surface 518 and surface 536. A third surface 540 may extend toward and around the second groove 532. The third surface 540 may extend from the second side 506 in direction toward the first side 504. The first surface 536, the second surface 538, and the third surface 540 may curve radially around the rotational axis of the piston 358.

The first seal 530 first seal may contact, abut, and fluidly seal against a first component placed around and rigidly coupled to the piston 358, such as the outer rotating component 318 and the drum 322 thereof shown via FIGS. 3-4B. Further the first seal 530 may rigidly couple with to the first component placed around the piston 358. Likewise, the second seal 534 may contact, abut, and fluidly seal against a second component the piston 358 is placed around and rigidly coupled to, such as the outer rotating component 318 and the extension 326 thereof shown via FIGS. 3-4B. Further the second seal 534 may rigidly couple with to the second component. Rotating the piston 358, and, more specifically, the first seal 530 and the second seal 534 with the first component and the second component may prevent or reduce degradation to the first seal 530 and the second seal 534 from sheer forces, frictional forces, and centripetal force, compared to if the piston 358 was rotating at a different speed from the first component and the second component. For example, rotating the piston 358 with the input 314, the outer rotating component 318, and, more specifically, the outer drum 322 and the extension 326 at approximately the same speed, may reduce or prevent degradation to the outer rotating component 318, the drum 322, and the piston 358, such as degradation from sheering forces, frictional forces, and centripetal force. Likewise, the rotating the piston 358 with the input with the input 314, the outer rotating component 318, and, more specifically, the outer drum 322 and the extension 326 at approximately the same speed, may prevent or reduce degradation to the first seal 530 and the second seal 534, such as degradation from sheering forces, frictional forces, and centripetal force.

The second side 506 may include a plurality of lands or other structures, referred to herein as pressers (e.g., presses), that may face, extend toward, contact, and press against one or more components of a clutch pack or one or more components housed via a counter-pressure chamber. For example, the pressers of the second side 506 may face, extend toward, contact, and press against components of the clutch pack 356 and the spring 362 of FIGS. 3-4B. The second side 506 may also include one or more supports that may be lands or other structures that one or more components of the disconnect assembly may rest upon and/or be supported by.

The pressers of the second side 506 may include a first presser 542, a second presser 544, and a third presser 546 that may be lands extending in a direction parallel with the axis 307. The first presser 542 may be arranged outward, such as radially outward, from the second presser 544 and the third presser 546 relative to the rotational axis of the piston 358. The second presser 544 may be arranged outward, such as radially outward, from the third presser 546 relative to the rotational axis of the piston 358. The fifth cavity 370 may be sandwiched between the first presser 542 and the second presser 544. Likewise, the sixth cavity 371 may be sandwiched between the second presser 544 and the third presser 546.

The supports of the piston 358 may include a support 548 that is radially inward from the third presser 546. The support 548 may be a cylindrical structure or a tubular structure, such as a collar, that the springs of the assembly 302, such as the spring 362 may rest upon.

The first presser 542 may have a fourth surface 552, the second presser 544 may have a fifth surface 554, and the third presser 546 may have a sixth surface 556 that may be a normal to the axis 508 and therein the rotational axis of the piston 358. The fourth surface 552 and the fifth surface 554 may be contact surfaces that may each contact, abut, and press against at least a plate of the clutch pack 356 of FIG. 3, such as a separator plate or friction plate of the separator plates 366 and the friction plates 368, respectively, of FIG. 3. Likewise, the sixth surface 556 may be a contact surface that may contact, abut, and press against one or more springs, such as the spring 362 of FIGS. 3-4B.

The second side 506 may also include a seventh surface 558 that curves around the fifth cavity 370 and an eighth surface 560 that curves around the sixth cavity 371. The surfaces 558, 560 are curved and may each have a circular radius.

The piston 358 may include a plurality of diameters, such as a first diameter 562, a second diameter 564, and a third diameter 566. The first diameter 562 may be an outer diameter and an outer width of the of the piston 358. Further, the first diameter 562 may be an outer diameter for the second step 524. The second diameter 564 may be an inner diameter of the second step 524 and the diameter of the first cavity 510. The third diameter 566 may be an inner diameter of the first step 522 and the diameter of the second cavity 512. The second diameter 564 is greater in distance than the third diameter 566.

The seventh surface 558 may have a curvature of a first radius 572. The eighth surface 560 may have a curvature of a second radius 574. The second radius 574 may be larger than the first radius 572.

Turning to FIG. 6, it shows a flow chart of a method 600 to close one or more of plurality of PTO disconnects of an assembly (e.g., a disconnect assembly) of the present disclosure, such as assembly 302 of FIGS. 3-4B, such that an input and an output thereof may selectively couple. The disconnect assembly includes a clutch assembly with an outer rotating component rigidly coupled to or a part of the input, an inner rotating component rigidly coupled to or a part of the output, and a clutch pack, such as the outer rotating component 318, the inner rotating component 320, and the clutch pack 356, respectively of FIGS. 3-4B. The outer rotating component may be an input to the clutch and may be rigidly coupled or a part of the input to the assembly, such as the input 314 of FIGS. 3-4B. The inner component may be an output from the clutch and may be rigidly coupled with or a part of the output of the assembly, such as the output 316 of FIGS. 3-4B. The piston may rigidly couple to and rotate with the outer rotating component and a shaft that may drive the outer rotating component, such as the input 314.

The piston includes seals, such as the first seal and second seal, or other features scaling the piston with the outer rotating component and an input coupled thereto, such that the piston fluidically seals against the input and other components rigidly coupled thereto. The sealing via the seals and/or other features of the piston create the counter-pressure chamber and the actuation chamber.

Method 600 begins at 602, opening a first valve to flow a first fluid to a counter-pressure chamber of the disconnect assembly. Opening the first valve, results in changing a pressure through and at the exit of the first valve, referred to herein as a first pressure. 602 also include flowing the first fluid from the first valve to the counter-pressure chamber via a first passage of a housing around the disconnect and at least a second passage of the shaft and/or the outer rotating component. Flowing fluid to the counter-pressure chamber may increase the pressure of the counter-pressure chamber and the first fluid housed within. The pressure of the counter-pressure chamber may be referred to herein as a second pressure. The second pressure is above a threshold such that a clutch pack of the clutch is cooled and lubricated via the first fluid traveling from the counter-pressure chamber through the clutch pack. Further 602 may include flowing the first fluid through a cavity around the shaft sandwiched between the shaft and the outer rotating component, such as the seventh cavity 375 of FIGS. 3-4B.

The first fluid flowed via the first valve may be a lubricant and a coolant, such as oil. Further the first fluid flowed may be a work-fluid. The first valve may be the second valve 424 of FIG. 4A or the fourth valve 434 of FIG. 4B. The counter-pressure chamber may be the counter-pressure chamber 374 of FIGS. 3-4B. The first passage of the housing may be the fourth passage 390 of FIGS. 3-4B. The second passage of the shaft may be the fifth passage 392 of FIGS. 3-4B. The cavity may be the seventh cavity 375 of FIGS. 3-4B. If the counter-pressure chamber is empty of first fluid or partially filled with first fluid, the counter-pressure chamber is filled with the first fluid such that the first fluid fills the approximate volume of the counter-pressure chamber. For an example, the approximate volume of the counter-pressure chamber is at a maximum volume or a threshold volume such that the piston is prevented from contacting the clutch pack.

The second pressure and the spring force of the springs of the counter-pressure chamber may place a plurality of forces on the piston in a direction parallel with the rotational axis referred to herein as first forces.

Method 600 continues to 604, opening a second valve to flow a second fluid to an actuation chamber. Opening the second valve, results in changing another pressure through and at the exit of the second valve. The pressure at and through the second valve may be referred to herein as a third pressure. 604 also includes flowing the second fluid from the first valve to the actuation chamber via a third passage of the housing around the disconnect and at least a fourth passage of the outer component. Flowing the second fluid to the actuation chamber increases pressure of the actuation chamber and the second fluid housed within. The pressure of the actuation chamber may be referred to herein as fourth pressure. 604 includes pressing one or more surfaces of the piston via forces from the fourth pressure. More specifically, 604 includes pressing one or more surfaces of a first step in fluid communication with actuation chamber with a force(s) having a vector parallel with the axis of rotation. The fourth pressure produces at least a second force having a vector parallel with the axis of rotation. 604 also includes flowing the second fluid to a cavity of the outer component in fluid communication with the actuation chamber.

The second fluid may be a work-fluid, such as oil, to the actuation chamber of the disconnect assembly. For a first example the first fluid of 602 and the second fluid of may be the same fluid sharing an approximately the same composition. For a second example, the first fluid and the second fluid of may be different fluids of differing compositions.

The first forces of the counter-pressure chamber and the second forces of the actuation chamber may have vectors opposite to one another. The first forces and second forces may combine to form a net force referred to herein as a third force. The third force may be positive, e.g., greater than a threshold of 0, when the magnitude of the second forces is greater than an opposing magnitude of the first forces. Likewise, the third force may be negatives, e.g., less than a threshold of 0, when the magnitude of the first forces is greater than the opposing magnitude of the second forces.

The second valve may be the first valve 422 of FIG. 4A or the third valve 432 of FIG. 4B. The actuation chamber may be the actuation chamber 372 of FIGS. 3-4B. The third passage may be the first passage 382, the fourth passage may be the second passage 384, and the cavity may be the eighth cavity 386. The first step may be the first step 522 of FIG. 5. If the actuation chamber is empty of second fluid or partially filled with second fluid, the actuation chamber is filled with the second fluid such that the second fluid fills the approximate volume of the actuation chamber. The volume of the actuation chamber may be the sum of a first volume of a hole, such as the hole 514 of FIG. 5, and a second volume of chambers within at least a step, such as the first cavity 510 and the second cavity 512, of a piston minus the volume of a component the piston is positioned around, such as the extension 326 of FIG. 3. For an example, the approximate volume of the counter-pressure chamber is at a minimum volume or below another threshold volume such that the piston is prevented from contacting the clutch pack.

Method 600 may continue to 605, rotating a shaft and the piston simultaneously. More specifically, spinning the shaft, the outer rotating component, and the piston around a rotational axis of the disconnect assembly. Rotation of the shaft and the piston may be a driven via a mover, such as an electric machine or an ICE. The shaft may be the input or may rigidly couple to the input. 605 is optional step of method 600 and may be skipped, such as if the shaft does not receive rotational energy or is locked from rotating. The shaft may be the input 314 or another shaft rigidly coupled to the input 314 of FIGS. 3-4B. Fluid sealing between the housing and the outer rotating component, and the outer rotating component and the piston, happens by means of piston rings, such as the first piston ring. Sealing provided via the piston rings may increase the life (e.g., amount of duty cycles) and decrease power losses via splashing or leaking of fluid from the disconnect assembly compared to other systems, such as a disconnect assemblies that may use a trust bearing in between a piston and a pressure plate of a clutch pack.

Method 600 continues to 606, increasing the third pressure to the second valve and the pressure of the fluid passages and other fluid lines, and the actuation chamber in fluid communication therein. For example, pressure may be increased to the second valve via increasing the power output and pressure on the pressure side of a pump in fluid communication with the second valve. For this or another example, the pressure may be increased to the second valve via diverting flow of the second fluid from and/or placing the pressure side of another pressure adjustment device, such as a fluid intensifier or pressure booster, in fluid communication with the valve.

Method 600 continues to 608, increasing the fourth pressure of the actuation chamber via flowing and/or pressurizing first fluid from the second valve. Method 600 and 608 continue to 610, increasing the fourth pressure of the actuation chamber above a first threshold of pressure. The fourth pressure may be increased above the first threshold, by increasing the third pressure to the second valve until equal to or above a second threshold of pressure. For an example, the second threshold of pressure may be approximately greater than or equal to the first threshold of pressure. For another example, the second threshold of pressure may be approximately less than or equal to the first threshold of pressure. Above the first threshold of pressure, the second forces placed on the piston from the actuation chamber greater than or equal to a threshold of force, such as to be greater than a sum of the third forces from the pressure of the counter-pressure chamber and spring force of one or more springs.

After 610, method 600 continues to 614, compressing the springs of the counter-pressure chamber and translating the piston. At 614, the actuation chamber begins increasing in volume and the counter-pressure chamber begins decreasing in volume. At the second threshold of pressure the second forces are greater than a non-zero threshold of force, referred to herein as a first threshold of force. At or above the first threshold of force, the second forces are greater than the first forces of the counter-pressure chamber, causing the springs and volume of the counter-pressure chamber to compress. The compression of the springs allows translation of the piston toward the clutch pack. The springs and counter-pressure chamber may continue to compress and the piston may continue to advance toward the clutch pack, until the compression of the springs and counter-pressure chamber increases the first forces and expansion of the actuation chamber decreases the second forces to be equal, causing the third force (e.g., net force) to equal zero. Further, upon contact between piston and the clutch pack, the resistive force of the clutch pack may add to the first forces upon contact between the piston and clutch pack, such that the first forces are equal in magnitude to the sum of the second forces and the resistive forces from the clutch pack. And therein, the pressing of the clutch pack in further steps of method 600 may stop the compression of the springs.

Method 600 continues to 616, translating the piston a first threshold of distance, placing at least a second step of the piston in fluid communication with the actuation chamber, and allowing one or more surfaces of the second step to be pressed upon via the forces from the pressure of the piston chamber. At the first threshold of distance a gap is formed large enough between a surface of the outer component that shapes the actuation chamber and one or more surfaces of the second step, allowing the second fluid to enter the gap. As the second fluid fills the gap, the gap becomes volumetrically continuous with and a part of the actuation chamber. Further the area of surfaces of the piston receiving force from pressure of the actuation chamber increases, decreasing the pressure of the actuation chamber and spreading the force therefrom over a larger area. Said in another way, before 616 the fourth pressure of actuation chamber pressure (e.g., clutch pressure) is first acting on a small piston diameter of a first area, and during and after 616 the fourth pressure is acting on a large piston diameter (e.g., relative to the small piston diameter). The large piston diameter and diameter of the outer diameter of second step may be approximately the total diameter of the clutch. The second step may be the second step 524 of FIG. 5. The increase in area decreases the pressure of the actuation chamber, and therein decreases the second forces on the piston from the counter-pressure chamber. Further the expansion of the formation of the gap and decrease in the second forces may decrease the speed the piston translates and the springs compress.

Method 600 continues to 618, advancing the piston a second threshold of distance into contact with a feature of the clutch pack. For example, advancing the piston to contact a plate of the clutch pack, such as a pressure plate or, alternatively, a separator plate or a friction plate. Contact may be made between the piston and the clutch pack via one or more lands extending from the piston toward the counter-pressure chamber, such as the first presser 542 and the second presser 544 of FIG. 3. At 620, method 600 continues by pressing the clutch pack, pressing the plates therein together, compressing and closing the clutch pack, and selectively coupling the outer rotating component to the inner rotating component. More specifically, at 620 closing the clutch pack selectively couples a drum of the outer rotating component to a drum of the inner rotating component. Upon closing the clutch pack, the pressed plates abut and resist further translation of the piston. Said in another way, the resistive force of the clutch pack adds an additional force to the first forces, and causes the first forces to become equal in magnitude to the second forces, and the third force to equal zero.

After 620, method 600 ends.

Turning to FIG. 7, it shows a flow chart of a method 700 to open one or more of a plurality of PTO disconnects of an assembly (e.g., a disconnect assembly) of the present disclosure, such as the assembly 302 of FIGS. 3-4B, such that an input and an output thereof may decouple from a state where selectively and rigidly coupled. The disconnect assembly includes a clutch assembly, such as clutch 310, with an outer rotating component, an inner rotating component, and a clutch pack, such as the outer rotating component 318, the inner rotating component 320, and the clutch pack 356, respectively, of FIGS. 3-4B. The outer rotating component may be an input to the clutch and may be rigidly coupled to another input to the disconnect assembly, such as the input 314 of FIGS. 3-4B. The inner component may be an output and may be rigidly coupled with an output to the disconnect assembly, such as the output 316 of FIGS. 3-4B. The piston may be rigidly coupled and rotate with the outer rotating component and a shaft that may drive the outer rotating component, such as the input 314.

Method 700 begins at 702, determining that the clutch of the disconnect assembly is in a closed state, selectively and rigidly coupling the outer rotating component and the inner rotating component and, by extension, selectively coupling the input and the output. At 702, the piston of the disconnect assembly is contacting the clutch pack, and pressing a plurality of plates of the clutch pack, such as the separator plates 366 and friction plates 368 of FIGS. 3-4B, together. The fourth pressure of the actuation chamber is equal to or above a first threshold of pressure and the piston is pressing with the second forces from the actuation chamber equal to or greater than a first threshold of force, selectively coupling the plates of the clutch pack via friction and therein selectively coupling the outer rotating component and the inner rotating component. Further, the second forces are equal to the sum of the first forces of the counter-pressure chamber and the resistive forces from the clutch pack, preventing further translation of the piston toward and against the clutch pack.

Method 700 continues to 602 introduced in method 600 of FIG. 6, opening the first valve to flow a first fluid that to a counter-pressure chamber of the disconnect assembly. Opening the first valve, results in changing a pressure through and at the exit of the first valve to the first pressure. The first valve may be the second valve 424 of FIG. 4A or the fourth valve 434 of FIG. 4B. The counter-pressure chamber may be the counter-pressure chamber 374 of FIGS. 3-4B.

602 may also include flowing the first fluid from the first valve to the counter-pressure chamber via the first passage of the housing around the disconnect and at least the second passage of the shaft and/or the outer rotating component. First fluid flowed via the first valve may be a work fluid, a lubricant, and a coolant, such as oil. The first passage of the housing may be the fourth passage 390 of FIGS. 3-4B. The second passage of the shaft may be the fifth passage 392 of FIGS. 3-4B. The cavity may be the seventh cavity 375 of FIGS. 3-4B.

Method 700 continues to 604 introduced in method 600 of FIG. 6, opening the second valve to flow a second fluid to the actuation chamber. Opening the second valve, results in changing another pressure through and at the exit of the second valve to approximately a second pressure. 604 also includes flowing the second fluid from the first valve to the actuation chamber via the third passage of the housing around the disconnect and the fourth passage of the outer component. It is to be appreciated that the pressure of the actuation chamber may be at a fourth pressure before opening the second valve. The second valve may be the first valve 422 of FIG. 4A or the third valve 432 of FIG. 4B. The actuation chamber may be the actuation chamber 372 of FIGS. 3-4B. The third passage may be the first passage 382, the fourth passage may be the second passage 384, and the cavity may be the eighth cavity 386.

604 includes pressing one or more surfaces of a first step in fluid communication with actuation chamber with the second forces, where the second forces remain parallel with the axis of rotation and may remain equal to or greater than the first threshold of force. 604 also includes flowing the second fluid to a cavity of the outer component in fluid communication with the actuation chamber. The second fluid may be a work-fluid, such as oil, to an actuation chamber of the disconnect assembly.

For a first example the first fluid and the second fluid of may be the same fluid sharing an approximately the same composition. For a second example, the first fluid and the second fluid of may be different fluids of differing compositions. At 604 for method 700, the fourth pressure is at or above the first threshold of pressure.

It is to be appreciated, the steps of opening the first valve at 602 and/or the second valve at 604 may occur before the start of method 700. If the first valve is already opened, 602 may be skipped. If the second valve is already opened, 604 may be skipped.

Method 700 may continue to 605 introduced in method 600 of FIG. 6, rotating a shaft and the piston simultaneously. Rotation of the shaft and the piston may be a driven via a mover, such as an electric machine or an ICE. The shaft may be the input or may rigidly couple to the input. 605 is optional step of method 600 and may be skipped, such as if the shaft does not receive rotational energy or is locked from rotating. The shaft may be the input 314 or another shaft rigidly coupled to the input 314 of FIGS. 3-4B.

Method 700 continues to 706, decreasing the magnitude of the second forces pressing against the clutch and, more specifically, the clutch pack of the disconnect assembly via the piston. 706 of method 700 includes a plurality of sub-steps including at least 708. At 708, method 700 includes decreasing the pressure the actuation chamber.

708 of method 700 includes a plurality of sub-steps. 708 begins at 710 by decreasing the third pressure at the second valve, and therein the pressure of the fluid passages, other fluid lines, and the actuation chamber in fluid communication therein. For example, the third pressure may be decreased to the second valve via decreasing the power output and pressure on the pressure side of a pump in fluid communication with the second valve. Additionally or alternatively, the third pressure may be decreased via placing the second valve in fluid communication with the suction side of the pump, the suction side of another pump, and/or the suction side of another pressure adjustment device, such as a pressure intensifier or a pressure booster. Additionally or alternatively, the third pressure may be decreased via placing the second valve in fluid communication with a fluid body at a lower pressure than the second valve and the actuation chamber, such as a reservoir or a sump. Placing the second valve in fluid communication with the suction side of a pressure adjustment device or a fluid body having a lower pressure may flow fluid out of the fluid channels, fluid lines, and volumes of the disconnect assembly in fluid communication with second valve, decreasing the pressures therein. The second valve may be placed in fluid communication with the suction side of a pressure adjustment device or a fluid body via fluid coupling via another valve or a plurality of other valves. Further, the second valve may be removed from fluid communication with the pumping side of a pressure adjustment device via closing an additional valve or a plurality of additional valves fluidically coupled thereto. Method 700 therein continues to 712, decreasing the fourth pressure of the actuation chamber via the second valve. Said in another way, 712 includes depressurizing the actuation chamber. The fourth pressure of the second fluid decreases in pressure, and second fluid may flow out of the counter-pressure chamber via the second valve.

712 may include decreasing the fourth pressure of the actuation chamber below the first threshold. The fourth pressure may decrease below the first threshold after decreasing the third pressure through and exiting the second valve at 710, until the third pressure is less than a second threshold of pressure. For an example, the second threshold of pressure may be approximately greater than or equal to the first threshold of pressure. For another example, the second threshold of pressure may be approximately less than or equal to the first threshold of pressure. Below the first threshold of pressure, the second forces placed on the piston from the actuation chamber decreases to less than the first threshold of force, such as to be less than a sum of third forces from the sum of first forces of the counter-pressure chamber and the resistive forces of the clutch pack. Said in another way, the third force (e.g., net force) to decreases to a non-zero threshold, where below the first threshold of pressure the third force may be negative.

Method 700 continues to 722, actuating the clutch, via expanding and decompressing the clutch pack therein after decreasing the second forces from the piston and actuation chamber below the first threshold. 722 includes opening the clutch pack from a closed state, via decreasing the first force to the clutch, via decreasing the fourth pressure of the actuation chamber and increasing the second pressure of the counter-pressure chamber. The decrease in the first force to the clutch below another threshold of force, such as zero, allows for expansion of the clutch pack expanding the plates apart therein.

Method 700 continues to 724 expanding the spring and actuating the piston via translation toward the actuation chamber. More specifically, the piston begins translating in a direction parallel with the axis of rotation toward the actuation chamber, and more specifically toward one or more surface of the outer rotating component around the actuation chamber. Actuation is accomplished by the third forces of the springs and the second pressure of the counter-pressure chamber becoming greater than the second forces from the fourth pressure of the actuation chamber. At 724, the actuation chamber begins decreasing in volume and compressing, and the counter-pressure chamber begins increasing in volume and decompressing. It is to be appreciated, that 722 and 724 may occur approximately simultaneously, or 724 may occur before 722.

Method 700 continues to 726, opening the clutch via translating the piston a first threshold of distance toward the actuation chamber from a starting position where the clutch is closed. More specifically, at 726, the friction plates and separator plate finish expanding out of contact. Further, at 726, the full decompressing and opening of the clutch pack includes decoupling the outer rotating component to the inner rotating component. More specifically, at 726 opening of the clutch pack decouples a drum of the outer rotating component to a hub of the inner rotating component. At 726 the piston may still be contacting the clutch pack of the clutch via a plate. The plate may be a pressure plate or, alternatively, a friction plate or separator plate.

Method 700 continues to 738, translating the piston out of contact with and away from the clutch and the clutch pack therein. The piston continues to be actuated via the second forces in from the counter-pressure chamber, including forces from the springs and the second pressure toward one or more walls of the outer rotating component around the actuation chamber.

Method 700 may continue 740, retracting the piston via translation to a second threshold of distance, scaling at least a step of the piston against at least a surface. The step of the piston may be an outer step of the of the piston, such as the second step 524 of FIG. 5. The surface may be a surface of the outer rotating component, such as the first surface 352 of FIGS. 3-4B. At the second threshold of distance a gap formed between the surface and one or more surfaces of the step is eliminated or decreased below a threshold of volume, pushing the second fluid out of the gap. Further, the area of surfaces of the piston receiving second forces from pressure of the actuation chamber decreases, increasing the pressure of the actuation chamber and shrinking the area. The second forces may increase in magnitude, decreasing a first speed the piston retracts and a second speed the spring expands. Said in another way, before 740 the fourth pressure of the actuation chamber is first acting on a first piston diameter of a first area. After 616 the fourth pressure is acting on a smaller second piston diameter of a smaller second area (e.g., where small is relative to the first piston diameter and first area). The second force may increase after closing the gap. The first piston diameter and diameter of the outer diameter of second step may be approximately the total diameter of the clutch. The second step may be the second step 524 of FIG. 5.

It is to be appreciated, that 740 is optional step of method 700 and may be skipped, such as if the piston lacks a step structure or has steps that remain in fluid communication with fluid passages fluidly coupled to or in fluid communication with the second valve.

Method 700 may continue to 742, where the piston may abut one or more surfaces of the outer rotating component and be prevented from translating further theretoward. The sum of a resistive force of one or more surfaces of the outer rotating component and the second forces increases to a non-zero threshold of force equal to the first forces.

It is to be appreciated, that 742 is optional step of method 700 and may be skipped, such as if the second forces increase to a non-zero threshold of force equal to the first forces before contact is made between the piston and rotating component.

After 738, after 740, or after 742, method 700 ends.

Therein the inventors have developed methods, such as method 600 and method 700, that provide support for actuating a clutch of a disconnect of a PTO comprising: sealing a piston of the disconnect with a shaft, such that the piston fluidically seals against the shaft and other components rigidly coupled thereto and creates a counter-pressure chamber and an actuation chamber on opposite sides thereof, rotating the piston with the shaft around an axis of rotation, increasing a first pressure of a first work fluid at a first valve of the disconnect in fluid communication with the counter-pressure chamber, flowing the first work fluid from the first valve to the counter-pressure chamber via a first passage of a housing around the disconnect and at least a second passage of the shaft, pressurizing the counter-pressure chamber to a second pressure of a first threshold preventing self-closing of the piston above a second threshold of rotational speed, flowing the first work fluid to a clutch pack of the clutch from the counter-pressure chamber via features of the piston, cooling the clutch pack via the first work fluid, changing a third pressure of a second work fluid at a second valve of the disconnect in fluid communication with the actuation chamber for the piston and at least a surface of the piston, pressurizing the actuation chamber to a fourth pressure of a third threshold, and, actuating the piston in a direction parallel with the axis of rotation via a net force from the second pressure of the counter-pressure chamber and the fourth pressure of the actuation chamber.

Further, in a first example the inventors have developed a method, such as method 600, comprising: increasing the fourth pressure to the third threshold, pressing on at least a first surface of a first step of a first diameter of the piston facing the actuation chamber via the fourth pressure, compressing a spring of the counter-pressure chamber, translating the piston toward the clutch pack, translating the piston a first distance of at least fourth threshold such that at least a second surface of a second step of a second diameter of the piston is placed in fluid communication with the actuation chamber, pressing on at least the second surface via force from the fourth pressure, translating the piston a second distance of at least a fifth threshold into surface sharing contact with the clutch pack, pressing plates of the clutch pack, and closing the clutch pack selectively coupling an input of the disconnect to an output of the disconnect, where the second diameter of the second step is greater than the first diameter of the first step.

Further in a second example the inventors have developed a method, such as method 700, optionally including the first example comprising: decreasing the fourth pressure to the third threshold, decreasing force placed on the piston from the actuation chamber and removing force from the piston to the clutch pack, expanding a spring of the counter-pressure chamber, translating the piston away from the clutch pack, opening the clutch pack and decoupling an input of the disconnect from an output of the disconnect, translating the piston a first distance of at least a fourth threshold out of contact with the clutch pack, and translating the piston a second distance of at least a fifth threshold such that at least a surface of a step of a diameter of the piston seals against a surface of the shaft and exits fluid communication with the actuation chamber.

Turning to FIG. 8, it shows a flow chart of a method 800 for cooling a clutch and the clutch pack for a disconnect of a PTO, such as the clutch 310 and the clutch pack therein of disconnect assembly 302 of FIGS. 3-4B. The clutch is force cooled via a fluid. The fluid is a coolant for the clutch pack. Further the fluid is a lubricant for the plates of the clutch pack. Additionally, the fluid is work fluid for a counter-pressure chamber of the disconnect assembly, where the fluid that may react against forces that may translate a piston facing the counter-pressure chamber with surfaces contacting the fluid therein. The fluid may be oil. The clutch includes an outer rotating component, an inner rotating component, and a clutch pack, such as the outer rotating component 318, the inner rotating component 320, and the clutch pack 356, respectively, of FIGS. 3-4B. The outer rotating component may be an input to the clutch and may be rigidly coupled to another input to the disconnect assembly, such as the input 314 of FIGS. 3-4B. The inner rotating component may be an output from the clutch and may be rigidly coupled with an output to the disconnect assembly, such as the output 316 of FIGS. 3-4B. The piston may be rigidly coupled and rotate with the outer rotating component and a shaft that may drive the outer rotating component, such as the input 314.

Method 800 begins at 802 by opening a valve in fluid communication with the counter-pressure chamber. The valve may be opened to be in fluid communication with a reservoir, a line, or another volume of the fluid. The valve is in fluid communication with the counter-pressure chamber of the assembly via at least a first fluid passage of a housing for the disconnect assembly and the clutch, and via at least second fluid passage of a shaft. The shaft may be the input to the disconnect assembly via which rotational energy, such as via torque, may rotate the disconnect and components of the clutch. The counter-pressure chamber is positioned around the shaft and around features of the outer rotating component and the inner rotating component. Further the counter-pressure chamber is sandwiched between a piston, such as the piston 358, and the inner rotating component. The valve may be the first valve described via the method 700 of FIG. 7 and method 800 of FIG. 8. Further, the valve may be either the second valve 424 of FIG. 4A or the fourth valve 434 of FIG. 4B. The first passage may be the fourth passage 390 of FIGS. 3-4B. The second passage may be the fifth passage 392 of FIGS. 3-4B. The housing may be the housing 308 of FIGS. 3-4A.

Optionally, method 800 may continue to 804, increasing pressure of the fluid to the valve, such as if a first pressure to the valve is below a first threshold of pressure. Above the first threshold of pressure the flow rate of the fluid through the valve, (e.g., the volumetric flow rate) is great enough to continuously fill the counter-pressure chamber to a desired fluid level, allowing for transportation of the fluid to the clutch pack. Said in another way the first threshold of pressure may be a minimum pressure to force cool the clutch via the fluid of the counter-pressure chamber. It is to be appreciated that method 800 is optional and may be skipped if the pressure of the valve is at or above the first threshold of pressure.

Method 800 continues to 806, flowing the fluid via the at least the first fluid passage through the housing for the clutch and toward the shaft.

Upon the fluid exiting the first fluid passage, method 800 continues to 808, flowing the fluid into the second fluid passage from the first fluid passage, and flowing the fluid via at least the second fluid passage to the counter-pressure. Fluid may exit the second fluid passage via flowing to a volume around a rotating element of the disconnect assembly, such the seventh chamber of FIGS. 3-4B. For an example, the rotating element may be the shaft and input to the disconnect assembly. For another example, the rotating element may be another shaft and the output of the disconnect assembly, such as the output 316 of FIGS. 3-4B.

Method 800 continues to 809, flowing the fluid via at least the volume around the rotating element to the counter-pressure chamber. The volume is sandwiched between the rotating element and the outer rotating component of the clutch and disconnect assembly. 809 may include flowing fluid to the counter-pressure chamber via a third fluid passage, where the third fluid passage is a fluid passage is fluidically coupled to the volume and the counter-pressure chamber, and the third fluid passage extends through the outer rotating component. The third fluid passage may be the sixth passage 394 of FIGS. 3-4B.

Method 800 continues to 810, flowing the fluid into the volume of the counter-pressure chamber. Upon entering the counter-pressure chamber at least a portion of the fluid may flow outward toward the clutch pack. For example, a first portion of the fluid may flow to exit the counter-pressure chamber via a first means, while a second portion of the fluid may flow outward toward a volume housing a clutch pack and toward the piston.

Method 800 continues to 812, flowing the fluid from the counter-pressure chamber to the clutch pack. Fluid may flow outward, such as radially outward, between the counter-pressure chamber and the clutch pack. 812 may comprise a plurality of substeps, including 814, 815. At least one of either 814 or 815 may be completed for 812, and the other step of 814 or 815 is optional. However, method 800 may include carrying out both 814 and 815.

814 of 812 and method 800 includes flowing fluid through spaces and other volumes arranged between surfaces the piston and the clutch pack, such as through one or more cavities between features, such as one or more lands, of the piston. Pressure from the counter-pressure chamber drives the fluid through the cavities and between the features. The cavities and lands allow contact between surfaces of the piston and the clutch pack, for compression of the clutch pack, while allowing the fluid to flow to the clutch pack. For example, 814 may include flowing the fluid through a fifth cavity 370 and the sixth cavity 371 of FIGS. 3-5 and between a first presser 542 and a second presser 544 of FIG. 5.

815 of 812 and method 800 includes flowing fluid radially outward through a plurality of first fluid passages of the hub positioned around the counter-pressure chamber. The first fluid passages may be holes and, more specifically, bores extending outward through the hub from an axis the hub and counter pressure chamber are arranged radially round. The first fluid passages may extend radially outward through the hub. For example, 815 may include flowing the fluid through the eighth passages 389 of FIGS. 3-5.

Method 800 continues to 816, cooling the clutch pack via force cooling using the fluid, and flowing the fluid through the clutch pack. Upon entering the clutch pack, fluid flows between and coats the plates of the clutch pack, such as friction plates and separator plates. The coating of the plates and the flowing of fluid therebetween lubricates the clutch pack preventing degradation from heat and mechanical forces, such as degradation from friction. Further the coating of the plates and the flowing of fluid therebetween cools the plates, where the fluid acts a heat exchange medium force removing thermal energy from and cooling the plates. The fluid may coat and flow around other surfaces and features of the clutch pack removing thermal energy from and cooling the clutch pack. Said in another way, the fluid may be heated and carry thermal energy away from the plates of the clutch pack.

Method 800 continues to 818, flowing fluid from the clutch pack to one or more volumes around the drum of the clutch arranged around the clutch pack, removing thermal energy therefrom. 818 may include flowing fluid outward via a plurality of second fluid passages of the drum. The second fluid passages of the drum may be holes and, more specifically, bores. The fluid may be pushed out of the clutch pack through the second fluid passages via centripetal force and pressure. For example, 815 may include flowing the fluid through the seventh passages 387 of FIGS. 3-5.

Method 800 continues to 820, flowing the heated fluid from the volumes around the drum into the rotating element of the disconnect assembly. For example, at 820 flows the heated fluid with the first portion of the fluid through a shaft and an output.

Method 800 continues to 822, flowing the heated fluid with first portion of the fluid out of the disconnect assembly via lines fluidly coupled to lines in fluid communication with the rotating element. For example, at 822, the fluid may be flowed out of the disconnect assembly via the ninth passage 396.

After 822, thermal energy built up via friction and other mechanical forces from the clutch is removed from the disconnect, and method 800 ends.

Therein the inventors have developed a method to cool the clutch via circulating a work fluid and lubricant, such as oil, from a counter-pressure chamber to a clutch pack via one or more features of the piston and via flowing lubricant through at least a first passage of a housing and a second passage of an input shaft to the counter-pressure chamber, where input shaft couples to or comprises an input to the clutch. Further the input to the clutch is or includes an outer rotating component of the clutch, such as a drum, that selectively couples to an output. Further, the output includes or is rigidly coupled to an inner rotating component, such as a hub. The housing is positioned around a clutch pack and an input shaft rigidly coupled to at least a component of the clutch pack, flowing lubricant through at least a second passage of the input shaft, flowing lubricant through at least a counter-pressure chamber, where the counter-pressure chamber is formed between the input shaft and an output shaft and between a piston and the output shaft of the clutch, flowing lubricant to at least a cavity of the piston from the counter-pressure chamber, flowing lubricant from the cavity to the clutch pack, and coating a plurality of plates of the clutch pack with lubricant removing thermal energy therein. In a first example of the method, the method includes removing the lubricant from the clutch pack via the cavity and flowing fresh lubricant from the counter-pressure chamber, and removing thermal energy from the clutch via removal of lubricant and via convection between fresh lubricant delivered from the counter-pressure chamber mixing with lubricant flowing out from the clutch pack.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to powertrains that include different types of propulsion sources including different types of prime movers, internal combustion engines, and/or transmissions. The subject matter of the present disclosure includes all novel and non-obvious combinations and sub-combinations of the various systems and configurations, and other features, functions, and/or properties disclosed herein.

Note that the example control and estimation routines included herein can be used with various engine, electric machine, transmission, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

Note that the example control and estimation routines included herein can be used with various engine, electric machine, transmission, and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A disconnect for a power take off (PTO), the disconnect comprising:

- a housing, where the housing includes a plurality of fluid channels;
- a wet clutch, where the wet clutch comprises a clutch pack;
- a piston;
- an input, where the input is connected to an outer rotating component of the wet clutch;
- an output, where the output is connected to an inner rotating component of the wet clutch;
- a first seal that includes a first piston ring and is positioned between the housing and the outer rotating component; and
- a second seal that includes a second piston ring and is positioned between the housing and the inner rotating component;
- where the plurality of fluid channels includes a first flow path and a second flow path that both extend through the housing and the outer rotating component;
- where the clutch pack is hydraulically closed by way of a fluid from the first flow path acting on the piston and the piston pressing on the clutch pack;
- where the second flow path delivers lubricant to plates of the clutch pack.

2. The disconnect of claim 1, where the piston is configured to rotate with a shaft and fluidly seal the shaft to the housing, where one or more rings of the piston seal the shaft to the housing.

3. The disconnect of claim 2, where the shaft is the input.

4. The disconnect of claim 1, wherein the wet clutch comprises an actuation chamber formed between the outer rotating component and the piston, and a counter-pressure chamber formed between the inner rotating component and the piston, the actuation chamber fluidly coupled to a first flow path and the counter-pressure chamber fluidly coupled to a second flow path.

5. The disconnect of claim 4, wherein the second flow path is configured to force cool the wet clutch.

6. The disconnect of claim 5, wherein the second flow path is configured to force cool the clutch pack.

7. The disconnect of claim 4, wherein the piston presses upon the clutch pack in response to increasing fluid pressure in the actuation chamber.

8. The disconnect of claim 4, wherein the piston has a plurality of steps, with at least a first step of a first diameter and a second step of a second diameter, where the first diameter is less than the second diameter, and the first step is in fluid communication with the actuation chamber.

9. The disconnect of claim 8, where the piston is a threshold of distance from the outer rotating component and the second step is in fluid communication with the actuation chamber.

10. The disconnect of claim 4, wherein the counter-pressure chamber includes a spring applying a resistive force opposite to a direction of engagement of the piston.

11. The disconnect of claim 10, wherein the spring returns piston to a position in response to decreasing fluid pressure in the actuation chamber.

12. The disconnect of claim 1, wherein the clutch pack comprises a plurality of friction plates and a plurality of separator plates, wherein the piston pressing the plurality of friction plates into surface sharing contact with the plurality of separator plates compresses the clutch pack, and wherein reduction of force from the piston expands the plurality of friction plates from surface contact with the plurality of separator plates.

13. The disconnect of claim 1, where the wet clutch is normally closed during PTO operation of the disconnect.

14. The disconnect of claim 1, where the wet clutch is normally open during PTO operation of the disconnect.

15. The disconnect of claim 1, further comprising an integrated valve that fluidly couples to the disconnect.

16. A method of cooling a clutch for a disconnect of a PTO, comprising:

- flowing lubricant through at least a first passage of a housing, where the housing is positioned around a clutch pack and an input shaft rigidly coupled to at least a component of the clutch pack;
- flowing lubricant through at least a second passage of the input shaft;
- flowing lubricant through at least a counter-pressure chamber, where the counter-pressure chamber is formed between the input shaft and an output shaft and between a piston and the output shaft of the clutch;
- flowing lubricant to at least a space between the clutch pack and the counter-pressure chamber;
- flowing lubricant from the space to the clutch pack; and
- flowing lubricant through a plurality of plates of the clutch pack, thereby removing thermal energy there from;
- where:
  - a first seal that includes a first piston ring and is positioned between the housing and the outer rotating component; and
  - a second seal that includes a second piston ring and is positioned between the housing and the inner rotating component;
  - the plurality of fluid channels includes a first flow path and a second flow path that both extend through the housing and the outer rotating component;

the clutch pack is hydraulically closed by way of a fluid from the first flow path acting on the piston and the piston pressing on the clutch pack; and the second flow path delivers lubricant to plates of the clutch pack;

where the first flow path and the second flow path include sections that are perpendicular to a rotational axis of the inner rotating component.

17. The method of cooling the clutch of claim 16, comprising, removing the lubricant from the clutch pack via a plurality of fluid passages extending through a drum around the clutch pack and therein removing thermal energy from the clutch pack.

18. The method of cooling the clutch of claim 16, comprising, flowing lubricant to the clutch pack from the counter-pressure chamber via a plurality of passages through a plurality of fluid passages extending through a hub, where the clutch pack is around the hub and the space is a fluid passage of the fluid passages.

19. The method of cooling the clutch of claim 17, flowing lubricant through at least a cavity of the piston, where the cavity is the space, and the cavity enables flow between the piston and the clutch during closing of the clutch.

20. A disconnect for a power take off (PTO), the disconnect comprising:

an input connected to an inner rotating component of a wet clutch and an output connected to an outer rotating component of the wet clutch;

where the input selectively couples to the output by compressing a clutch pack;

where the clutch pack is compressed by way of a fluid acting on a piston and reacting on a shaft, where the fluid is delivered via an external flow;

a first seal that includes a first piston ring and is positioned between the housing and the outer rotating component; and a second seal that includes a second piston ring and is positioned between the housing and the inner rotating component;

where the plurality of fluid channels includes a first flow path and a second flow path that both extend through the housing and the outer rotating component; and where the first flow path and the second flow path include sections that are perpendicular to a rotational axis of the inner rotating component; and a bearing positioned axially between the first seal and the clutch pack.

* * * * *